(12) United States Patent
Fujii et al.

(10) Patent No.: US 9,031,009 B2
(45) Date of Patent: May 12, 2015

(54) TRANSMITTING/RECEIVING DEVICE, WIRELESS TERMINAL DEVICE AND WIRELESS COMMUNICATION METHOD FOR SUPPRESSION OF INTRA-SYSTEM INTERFERENCE

(75) Inventors: Hiromasa Fujii, Kanagawa (JP); Takahiro Asai, Kanagawa (JP); Tomoyuki Ohya, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 571 days.

(21) Appl. No.: 12/956,323

(22) Filed: Nov. 30, 2010

(65) Prior Publication Data
US 2011/0134855 A1 Jun. 9, 2011

(30) Foreign Application Priority Data

Dec. 3, 2009 (JP) ................................. 2009-275628

(51) Int. Cl.
*H04W 4/00* (2009.01)
*H04W 16/14* (2009.01)
*H04W 74/08* (2009.01)
*H04W 84/12* (2009.01)

(52) U.S. Cl.
CPC .......... *H04W 16/14* (2013.01); *H04W 74/0816* (2013.01); *H04W 84/12* (2013.01)

(58) Field of Classification Search
USPC ........................................................ 370/329
See application file for complete search history.

(56) References Cited

U.S. PATENT DOCUMENTS

| 2005/0058151 | A1 * | 3/2005 | Yeh .............................. 370/445 |
| 2005/0157747 | A1 * | 7/2005 | Yang et al. .................... 370/465 |
| 2006/0039281 | A1 * | 2/2006 | Benveniste ................... 370/230 |
| 2006/0209746 | A1 * | 9/2006 | Asai et al. .................... 370/328 |
| 2009/0163145 | A1 * | 6/2009 | Xhafa et al. ................... 455/68 |
| 2010/0091716 | A1 * | 4/2010 | Bonta et al. .................. 370/329 |

FOREIGN PATENT DOCUMENTS

JP 2006222665 8/2006

OTHER PUBLICATIONS

Extended Search Report for EP Patent Application No. 10193449.5-2412 dated May 20, 2011.
Lee, A novel Superframe for COgnitive Radio in HR-WPAN, Department of Computer Engineering, Feb. 15-18, 2009 ICACT 2009.

* cited by examiner

*Primary Examiner* — Phirin Sam
*Assistant Examiner* — Hai-Chang Hsiung
(74) *Attorney, Agent, or Firm* — MKG, LLC

(57) ABSTRACT

The present invention provide a transmitting/receiving device that includes a sensing period information setting part for, in an interfering system that shares at least a part of a frequency band with an interfered system, setting sensing period information that shows a sensing period for a signal using a shared frequency band; and a transmission prohibition period information notifying part for notifying a terminal in the interfering system of transmission prohibition period information for prohibiting transmission processing in the interfering system until an end of the sensing period, a maximum transmission period for one transmission by the terminal in the interfering system prior to a start point of the sensing period.

12 Claims, 16 Drawing Sheets

TRANSMITTING/RECEIVING DEVICE, WIRELESS TERMINAL DEVICE AND WIRELESS COMMUNICATION METHOD FOR SUPPRESSION OF INTRA-SYSTEM INTERFERENCE

CROSS REFERENCE TO RELATED APPLICATION

This application is based upon and claims the benefit of priority from the prior Japanese Patent Application No. 2009-275628, filed on Dec. 3, 2009; the entire contents of which are incorporated herein by reference.

BACKGROUND

1. Field of the Invention

The present invention relates to a transmitting/receiving device, a wireless terminal device and a wireless communication method for sharing a part of frequencies in a complex system including plural communication systems.

2. Description of the Related Art

Conventionally, a study has been made about a method of secondary use of a frequency band of TVWS (TV White Space) using sensing. In the secondary use of a frequency band used in broadcasting, there exists a wide not-used area of the frequency band and it has enough usage value even in a frequency sharing method of comparatively low accuracy. Meanwhile, in secondary use of a frequency band between cellular systems, the area is developed closely in an interfered system (system that suffers from interference) and the not-used frequency area is not broad. Therefore, it is necessary to provide a frequency use method of higher accuracy.

As a method of commonly using a part of frequencies in a complex system including an interfered system (primary system or system that suffers from interference) and an interfering system (secondary system, system that inflicts interference on others), there is known a method in which the interfering system uses a shared frequency band in accordance with presence or absence of a signal of the interfered system in the shared frequency band (see Japanese Patent Application Laid-Open No. 2006-222665). In this method of sharing a frequency band, estimation is done whether or not a signal component of the interfered system is contained in a received signal sensed by the interfering system, and if the received signal does not contain the signal component of the interfered system, the shared frequency band is used in transmission thereby to reduce interference on the interfered system.

However, in the method of sharing a frequency band in the complex system disclosed in JP2006-222665, it is difficult to estimate a signal component of the interfered system accurately due to intra-system interference of the interfering system. In this case, the intra-system interference in a sensing period can be suppressed by issuing a directive to prohibit transmission processing to each terminal in the interfering system before the sensing period. However, if the transmission processing of each terminal is started before issuance of the directive immediately before the sensing period, the terminal cannot be notified of the directive and the intra-system interference in the sensing period cannot be suppressed.

SUMMARY OF THE INVENTION

The present invention has as one object, to provide a transmitting/receiving device, a wireless terminal device and a wireless communication method that allow, in an interfering system that shares at least a part of a frequency band with an interfered system, suppression of intra-system interference of the interfering system during a sensing period.

The transmitting/receiving device of the present invention comprises: a sensing period information setting part for, in an interfering system that shares at least a part of a frequency band with an interfered system, setting sensing period information that shows a sensing period for a signal using a shared frequency band; and a transmission prohibition period information notifying part for notifying a terminal in the interfering system of transmission prohibition period information for prohibiting transmission processing in the interfering system until an end of the sensing period, a maximum transmission period for one transmission by the terminal in the interfering system prior to a start point of the sensing period.

BRIEF DESCRIPTION OF THE DRAWINGS

The various features of novelty which characterize the invention are pointed out with particularity in the claims attached to and forming a part of this specification. For a better understanding of the invention, its operating advantages, and specific object attained by its use, reference should be had to the accompanying drawings and descriptive matter in which there is illustrated and described, embodiments of the present invention.

DETAILED DESCRIPTION

Figure 1:
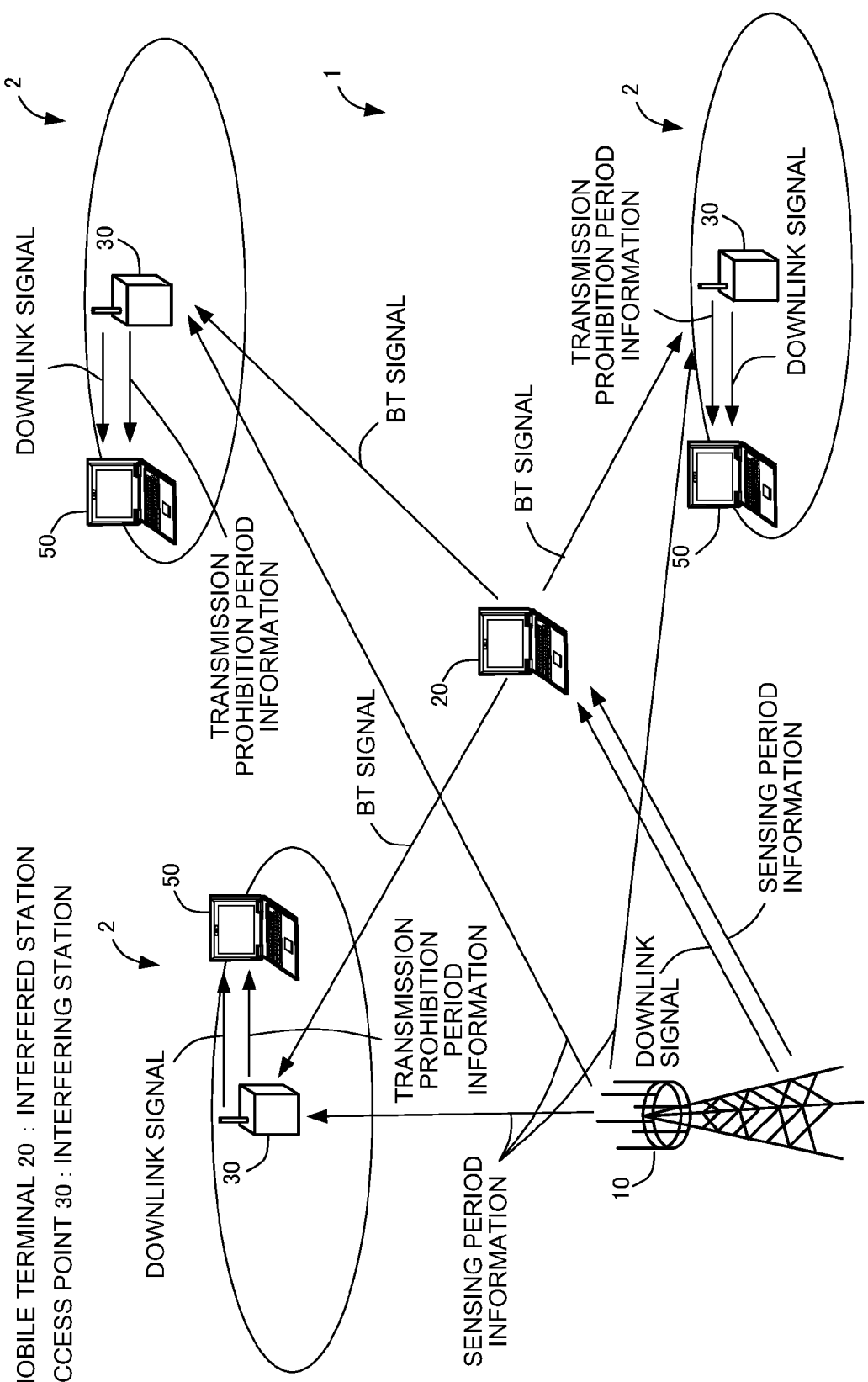
FIG. 1 is a schematic view of a complex system, illustrating a first exemplary embodiment of the present invention.

With reference to the attached drawings, an embodiment of the present invention will be described in detail below. This embodiment is described by way of example of a complex system where an interfered system (system that suffers from interference) can include a mobile communication system such as a cellular system and an interfering system (system that inflicts interference on others) can include a wireless LAN system. However, the complex system is not limited to this configuration and may be modified to include other interfered systems and interfering systems without departing from the broader aspects of the present invention. FIG. 1 is a schematic view of the complex system according to an embodiment of the present invention. Each of the interfered system and the interfering system may have plural terminals, but, here, has only one terminal for convenience of explanation.

As illustrated in FIG. 1, the interfered system 1 is a mobile communication system (primary system). The interfered system 1 has a base station 10 and a mobile terminal 20 that communicates under control of the base station 10. In a cell area centering the base station 10, a plurality of interfering systems 2 is established. Each interfering system 2 is a wireless LAN system that makes secondary use of a frequency band used by the interfered system 1. Each interfering system 2 has an access point 30 and a wireless LAN terminal 50 that communicates under control of the access point 30.

In the following description, it is assumed that what serves as a receiving device among wireless stations that make up the interfered system 1 (base station 10 or mobile terminal 20) is an interfered station and what serves as a transmitting device among wireless stations that make up the interfering system 2 (access point 30 or wireless LAN terminal 50) is an interfering station. In FIG. 1, the downlink of the interfered system 1 is an interfered side and the downlink of the interfering system 2 is an interfering side. Accordingly, the mobile terminal 20 is the interfered station and the access point 30 is the interfering station.

FIG. 1 illustrates the example where the downlink of the primary system is the interfered side and the downlink of the secondary system is the interfering side. However, this combination of the interfered station and the interfering station is not intended for limiting the present invention. Combination of the interfered station and interfering station may be the uplink/downlink of the primary system side as the interfered side and the uplink/downlink of the secondary system side as the interfering side, or the uplink/downlink of the primary system side as the interfering side and the uplink/downlink of the secondary system side as the interfered side.

In the frequency sharing according to the present embodiment, the time period for the mobile terminal 20 as the interfered station to transmit busy tone signals and the sensing period for the access point 30 as the interfering station to sense the busy tone signals are synchronized. The interfering station determines the sharing conditions based on a sensing result and uses the determined sharing conditions as a basis to transmit signals. Besides, the access point 30 transmits transmission prohibition period information to the wireless LAN terminal 50 and prohibits the transmission processing of the wireless LAN terminal 50 during a NAV (Network Allocation Vector) period mentioned in the transmission prohibition period information. With this structure, the access point 30 suppresses intra-system interference of the interfering system 2 during the sensing period.

The sharing conditions determined in the interfering system 2 are conditions that are imposed on the interfering station to keep the interference less than an interference permissible level in a wireless communication environment of the current interfered system 1 when the interfering station transmits a signal using a shared frequency band that overlaps a frequency band used by the interfered system 1. The sharing conditions may contain parameters of transmission power, sharing condition applicable period, use frequency band and the like. The sharing conditions contain at least transmission power information when parameters of the sharing condition applicable period, the use frequency band and the like are fixed between the systems.

The transmission prohibition period information transmitted by the access point 30 may be such information as to prohibit transmission processing of the wireless LAN terminal 50 until a fixed time period expires. For example, the transmission prohibition period information may be configured of a CTS (Clear to Send) frame referring to the NAV period. With this configuration, the configuration of an existing wireless LAN system may be used to set the transmission prohibition period to the wireless LAN terminal 50. Besides, the NAV period mentioned in the transmission prohibition period information is a period covering the sensing period, starting before a start point of the sensing period.

Here, description is made about the system overview of the complex system illustrated in FIG. 1, assuming the mobile terminal 20 is the interfered station and the access point 30 is the interfering station.

The base station 10 of the interfered system 1 transmits, to the access point 30 of the interfering system 2, sensing period information that indicates the sensing period via the wired network or wireless network. Further, the base station 10 transmits the sensing period information directly to the mobile terminal 20 as the interfered station.

The access point 30 transmits the transmission prohibition period information to the wireless LAN terminal 50 before starting of the sensing period notified from the base station 10. The wireless LAN terminal 50 prohibits transmission processing until the NAV period mentioned in the transmission prohibition period information expires. In this case, the NAV period covers a period before starting until expiration of the sensing period. Accordingly, the wireless LAN terminal 50 is prohibited to perform transmission processing during the sensing period.

The mobile terminal 20 transmits a busy tone signal during the sensing period notified from the base station 10. On the other hand, the access point 30 detects the busy tone signal during the sensing period when the mobile terminal 20 transmits the busy tone signal. The access point 30 determines the sharing conditions that allow the interference level given to the mobile terminal 20 to be reduced less than the interference permissible level based on a detection result of the busy tone signal. The access point 30 performs transmission with the transmission power and a use frequency specified in the sharing conditions during the sharing condition applicable period specified in the determined sharing conditions.

Figure 2:
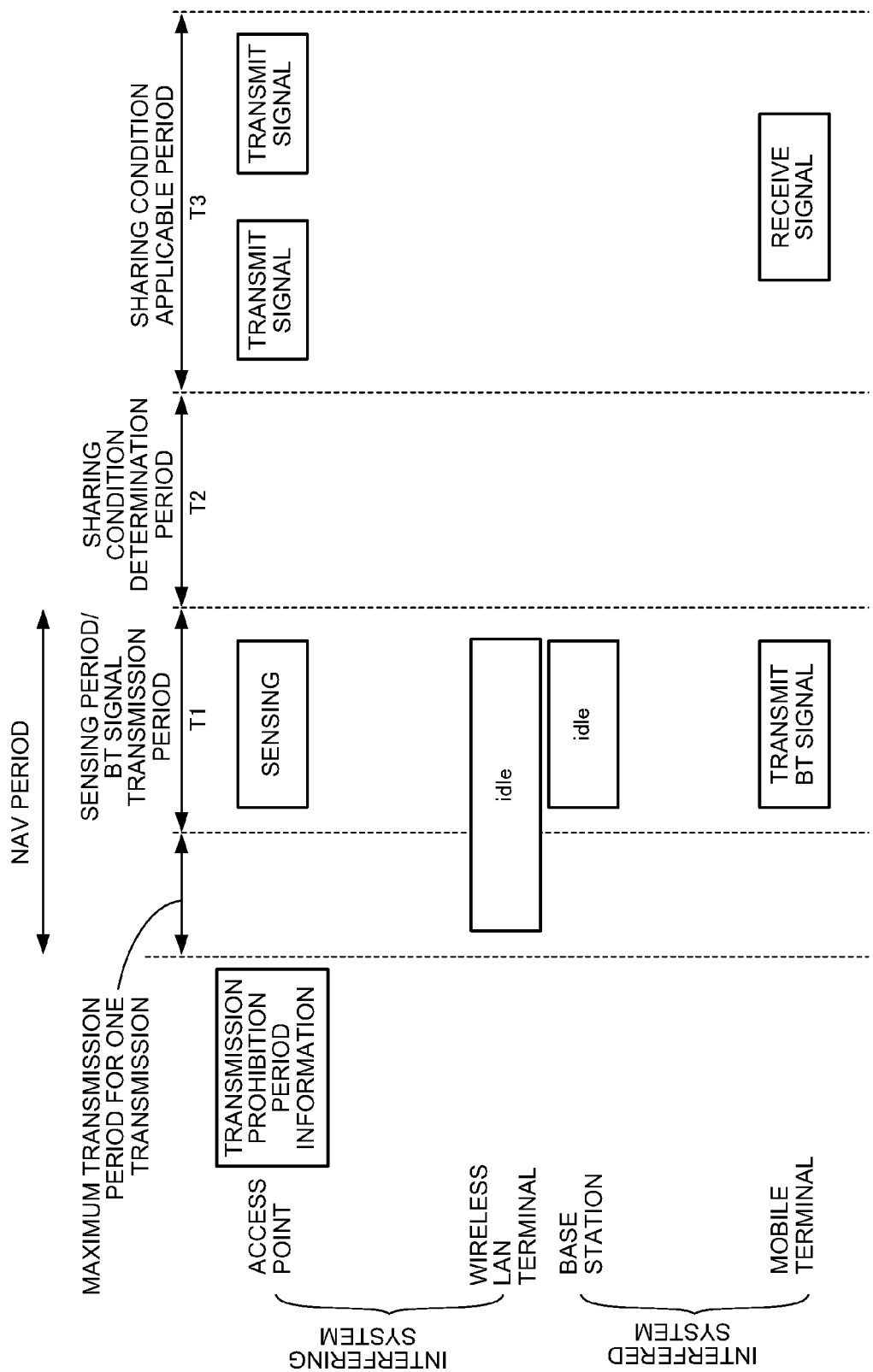
FIG. 2 is a timing chart of a control cycle, illustrating the first exemplary embodiment of the present invention.

FIG. 2 is a timing chart illustrating a control cycle according to the present embodiment. Before the sensing period T1, the access point 30 of the interfering system 2 transmits the transmission prohibition period information to the wireless LAN terminal 50. On receiving the transmission prohibition period information, the wireless LAN terminal 50 comes into an idle state in which it does not perform the transmission processing, before starting of the sensing period T1. The idle state of the wireless LAN terminal 50 shows a state where there is no intra-system interference in the interfering system 2 during the sensing period and may include a short time transmission state where the transmission processing is finished before the start point of the sensing period.

In the sensing period T1, the mobile terminal 20 of the interfered system 1 that performs reception in a next receiving zone is an interfered station and the access point 30 that is to perform transmission in a zone that overlaps the receiving zone in the interfering system 2 is the interfering station. The base station 10 of the interfered system 1 comes into the idle state where it does not perform transmission processing. Otherwise, the base station 10 comes into a state where it performs transmission with another frequency band that does not affect the shared frequency. The idle state in the sensing period indicates a transmission state that does not affect detection of an interference level with the sharing frequency, and may include a transmission state with another frequency band as far as it does not affect the shared frequency.

During the sensing period T1, the mobile terminal 20 transmits a busy tone signal and the access point 30 detects a busy tone signal while it stops transmission. In the sharing condition determination period T2, the access point 30 uses a detection result of the busy tone signal as a basis to determine the sharing conditions (transmission power, sharing condition applicable period, use frequency band and the like). In the sharing condition applicable period T3, the access point 30 transmits a signal using the determined sharing conditions. In the sharing condition applicable period T3, the interference level from the access point 30 is suppressed to be less than interference permissible level of the mobile terminal 20.

In this way, as the wireless LAN terminal 50 receives the transmission prohibition period information before starting of the sensing period from the access point 30 and then is prohibited to perform transmission processing, the intra-system interference of the interfering system 2 can be suppressed during the sensing period. Accordingly, as the access point 30 that is the interfering station can detect the busy tone signal accurately from the mobile terminal 20 as the interfered station, it is possible to predict the interference level on the mobile terminal 20 accurately and determine the transmission power so that the interference level can be suppressed within the interference permissible level.

Figure 3:
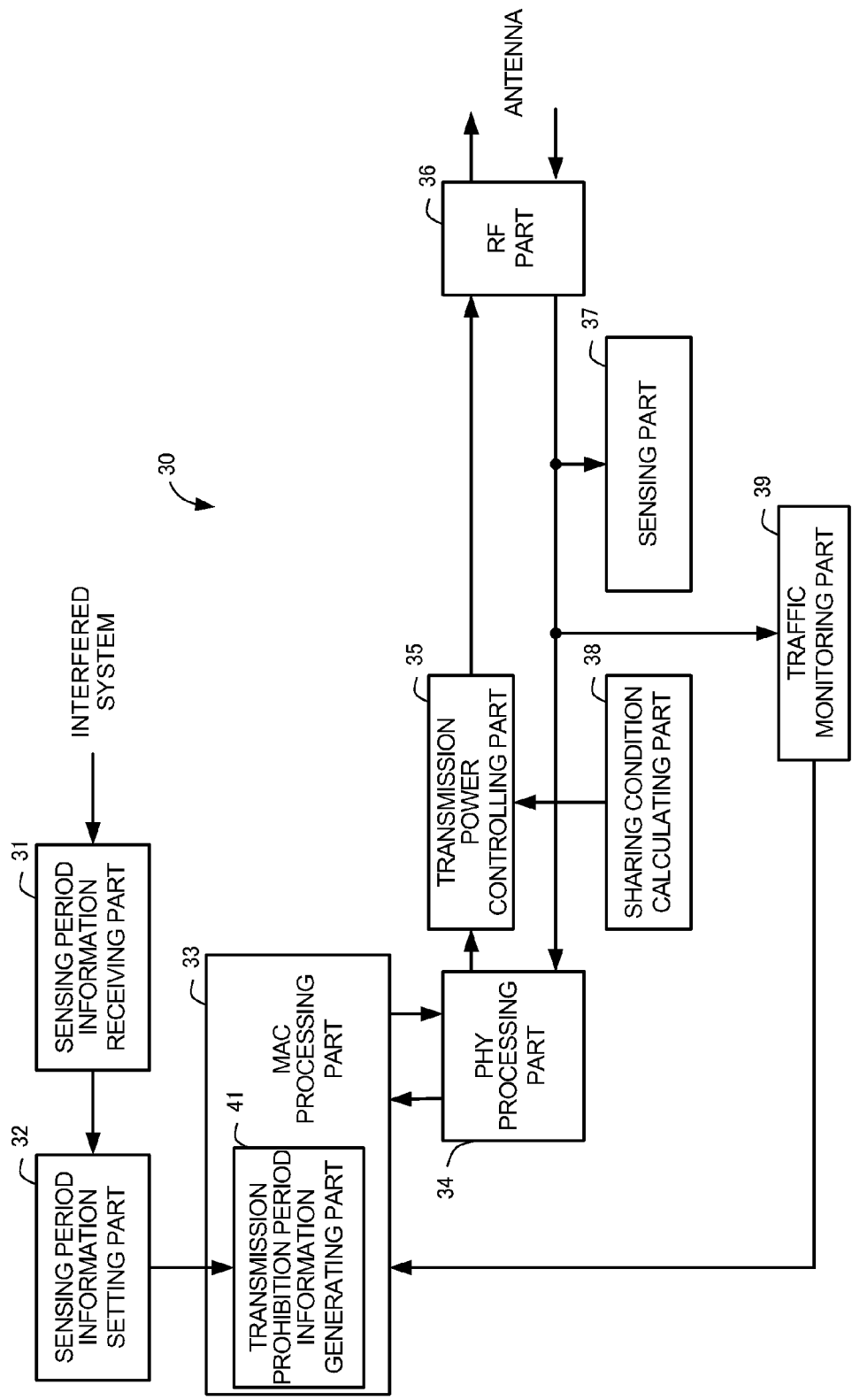
FIG. 3 is a functional block diagram of notifying processing of transmission prohibition period information of an access point when the access point is an interfering station and a mobile terminal is an interfered station according to the first exemplary embodiment of the present invention.
Figure 4:
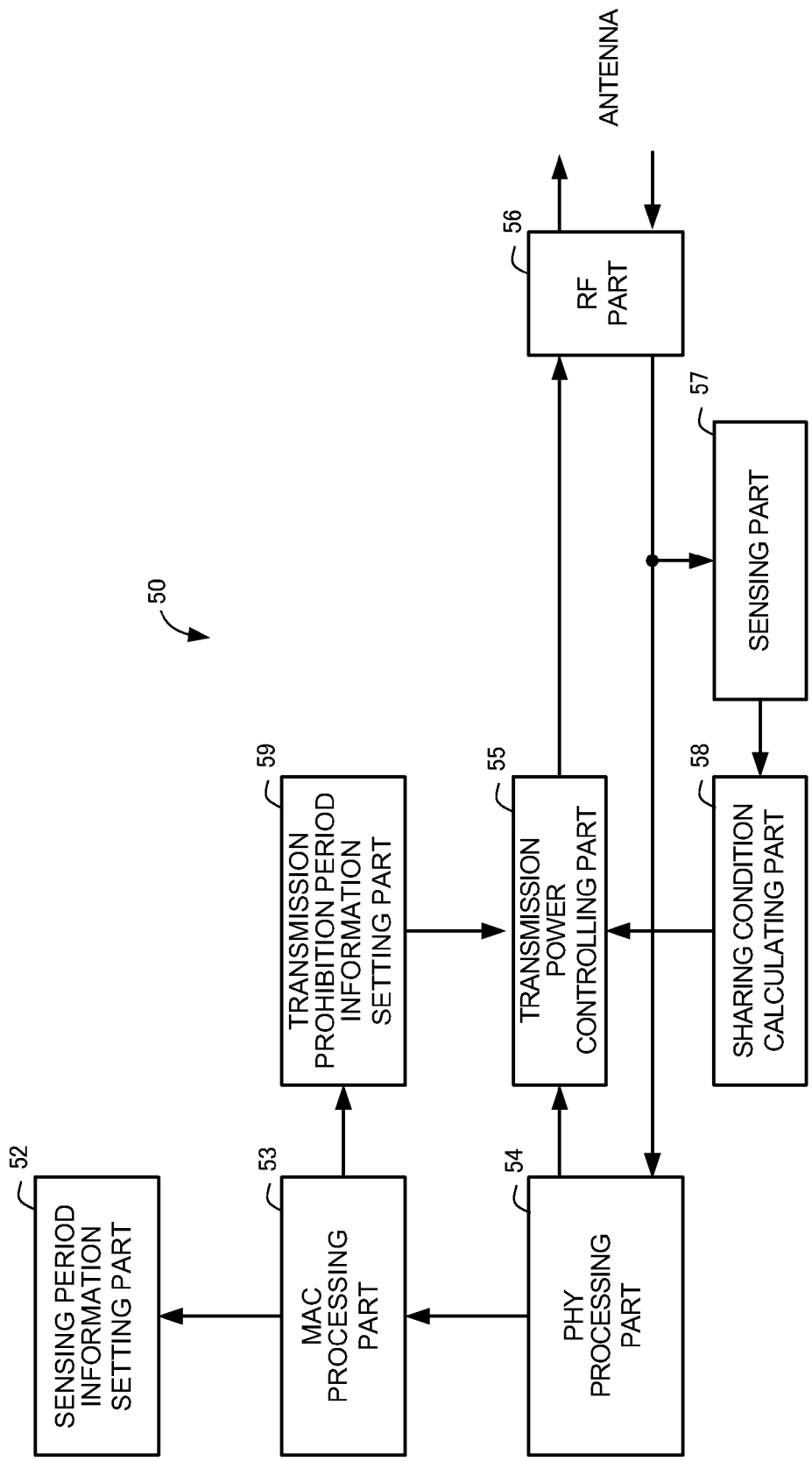
FIG. 4 is a functional block diagram of transmission prohibiting processing in a wireless LAN terminal when the access point is the interfering station and the mobile terminal is the interfered station according to the first exemplary embodiment of the present invention.

Here, with reference to FIGS. 3 and 4, description is made about the functional structure of the transmission prohibition control performed between the access point and the wireless LAN terminal. FIG. 3 is a functional block diagram of the notifying processing of the transmission prohibition period information by the access point when the access point as shown in FIG. 1 is the interfering station and the mobile terminal is the interfered station. Here, in FIG. 3, there are included functional blocks other than the notifying processing of the transmission prohibition period information, however, description of the functional blocks other than the notifying processing of the transmission prohibition period information is omitted here.

As illustrated in FIG. 3, the access point 30 has a sensing period information receiving part 31, a sensing period information setting part 32, a MAC processing part 33, a PHY processing part 34, a transmission power controlling part 35, an RF part 36 and a traffic monitoring part 39. Further, the MAC processing part 33 has a transmission prohibition period information generating part 41.

The sensing period information receiving part 31 receives the sensing period information from the base station 10 of the interfered system 1 via the wire or wireless network. The sensing period information setting part 32 sets a sensing period in a period indicated by the sensing period information received by the sensing period information receiving part 31. The sensing period is a period of time for sensing a busy tone signal transmitted from the mobile terminal, which period is synchronized with the transmission time of the busy tone signal.

The MAC processing part 33 performs media access control such as CSMA/CA or the like and controls transmission timing of the transmission data. The transmission prohibition period information generating part 41 of the MAC processing part 33 generates transmission prohibition period information such as CTS frame. The transmission prohibition period information has a NAV period set therein. The transmission timing of this transmission prohibition period information is set to be a maximum transmission period for one transmission by the wireless LAN terminal 50 prior to the start point of the sensing period set in the sensing period information setting part 32 by the MAC processing part 33 (see FIG. 6B).

The PHY processing part 34 converts the transmission data into a signal format in accordance with the frame format and performs processing such as bit interleaving, modulation mapping, error-correcting coding of transmission data containing the transmission prohibition period information input from the MAC processing part 33. The transmission power controlling part 35 controls the transmission power of the transmission data. The RF part 36 performs transmission processing of a wireless signal via an antenna and performs D/A conversion of the transmission data and conversion into a carrier frequency.

The traffic monitoring part has a threshold for determining the traffic volume and monitors whether or not the traffic volume received via the RF part 36 is equal to or more than the threshold. A monitoring result of the traffic monitoring part 39 is input to the MAC processing part 33. The MAC processing part 33 sets a backoff in the transmission prohibition period information based on the monitoring result input from the traffic monitoring part 39.

Specifically, the MAC processing part 33 makes setting in such a manner when the traffic volume is a threshold or more, the backoff is not set first. Besides, when the traffic volume is less than the threshold, the MAC processing part 33 sets the backoff first, and when it fails in contention, it does not set the backoff. Here, in the present embodiment, the traffic monitoring part 39 is configured to determine whether or not the traffic volume is equal to or more than the threshold. However, the MAC processing part 33 may determine whether or not the traffic volume monitored by the traffic monitoring part 39 is equal to or more than the threshold.

FIG. 4 is a functional block diagram of transmission prohibiting processing in the wireless LAN terminal when the access point as illustrated in FIG. 1 is the interfering station and the mobile terminal is the interfered station. Here, FIG. 4 contains functional blocks other than the transmission prohibiting processing, but their description is omitted here.

As illustrated in FIG. 4, the wireless LAN terminal 50 has a MAC processing part 53, a PHY processing part 54, a transmission power controlling part 55, an RF part 56 and a transmission prohibition period information setting part 59. The RF part 56 performs the reception processing of a wireless signal via an antenna and performs conversion of the received data from the access point 30 into a predetermined frequency and A/D converting processing.

The PHY processing part 54 performs receiving processing in a physical layer, and performs processing of bit deinterleaving, demodulation demapping, error-correcting decoding of received data input from the RF part 56. The MAC processing part 53 performs media access control such as CSMA/CA and the like and sets the reception timing of reception data containing the transmission prohibition period information. The transmission prohibition period information setting part 59 reads the NAV period mentioned in the transmission prohibition period information and makes the transmission power controlling part 55 control the transmission power thereby to prohibit transmission processing until expiration of the NAV period.

In this way, the access point 30 is configured to notify the wireless LAN terminal 50, via the MAC processing part 33, of the transmission prohibition period information a maximum transmission period for one transmission by the wireless LAN terminal 50 prior to the start point of the sensing period. In addition, the wireless LAN terminal 50 is configured to prohibit, by the transmission prohibition period information setting part 59, the transmission processing at the NAV period mentioned in the transmission prohibition period information. Here, the notifying processing of the transmission prohibition period information will be described in detail below.

Figure 5:
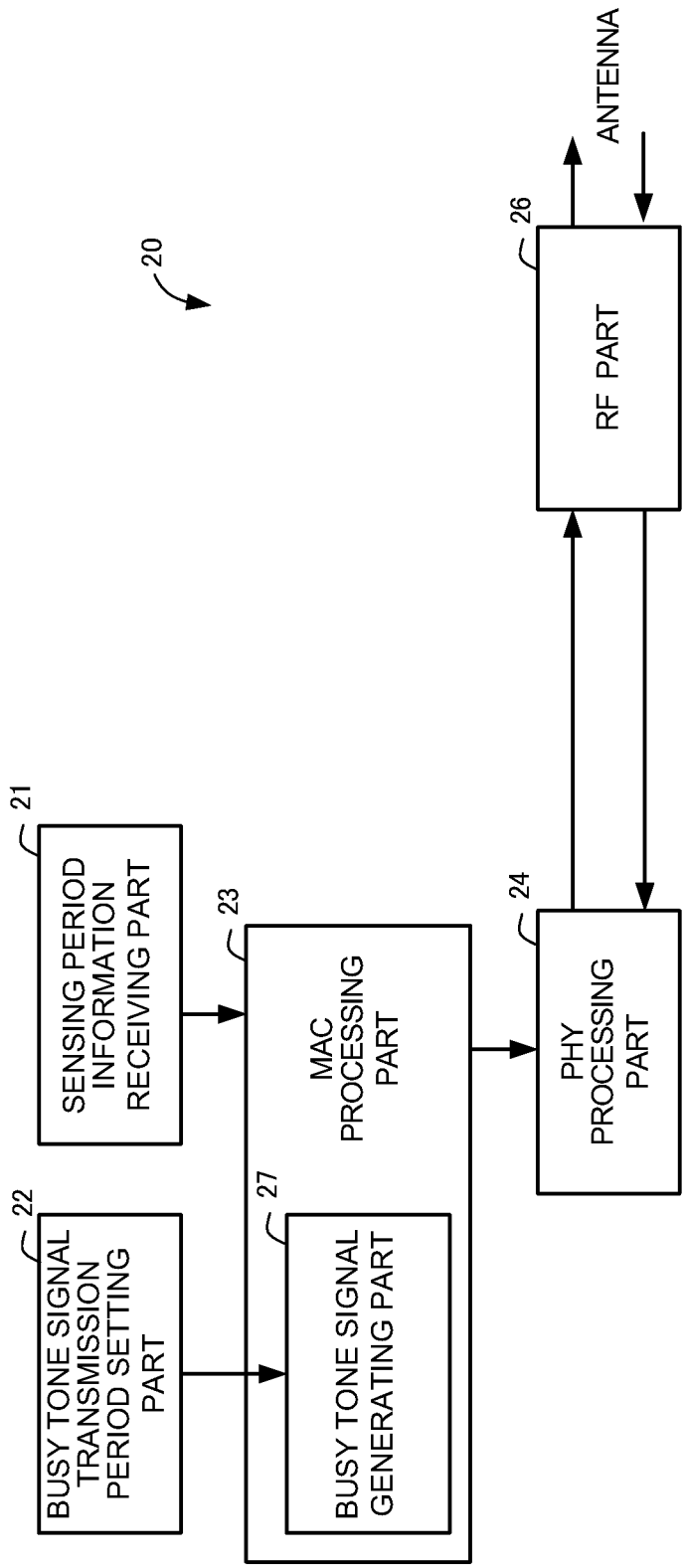
FIG. 5 is a functional block diagram of notifying processing of a busy tone signal in the mobile terminal when the access point is the interfering station and the mobile terminal is the interfered station according to the first exemplary embodiment of the present invention.

Next, with reference to FIGS. 3 to 5, description is made about the functional structure of the sensing control performed between the access point and the mobile terminal. FIG. 5 is a functional block diagram of notifying processing of a busy tone signal in the mobile terminal when the access point as illustrated in FIG. 1 is the interfering station and the mobile terminal is the interfered station.

As illustrated in FIG. 5, the mobile terminal 20 has a sensing period information receiving part 21, a busy tone signal transmission period setting part 22, a MAC processing part 23, a PHY processing part 24, and an RF part 26. Besides, the MAC processing part 23 has a busy tone signal generating part 27.

The sensing period information receiving part 21 receives the sensing period information transmitted from the base station 10. The busy tone signal transmission period setting part 22 sets a transmission period of the busy tone signal in a period indicated by the sensing period information received by the sensing period information receiving part 21. The MAC processing part 23 performs transmission processing in the MAC layer and controls transmission timing of transmission data and the like.

The busy tone signal generating part 27 of the MAC processing part 23 generates the busy tone signal that is transmitted in the transmission period of the busy tone signal set by the busy tone signal transmission period setting part 22. The PHY processing part 24 converts the transmission data into a signal format in accordance with the frame format and performs processing of bit interleaving, modulation mapping, error-correcting coding of the transmission data containing the busy tone signal input by the MAC processing part 23. The RF part 26 performs transmission processing of a wireless signal via the antenna and performs D/A conversion of the transmission data and conversion into a carrier frequency.

FIG. 3 is a functional block diagram of the sensing processing at the access point when the access point illustrated in FIG. 1 is the interfering station and the mobile terminal is the interfered station. Here, FIG. 3 contains function blocks other than the sensing processing, but their description is omitted here.

As illustrated in FIG. 3, the access point 30 has a sensing period information receiving part 31, a sensing period information setting part 32, a MAC processing part 33, a PHY processing part 34, a transmission power controlling part 35, an RF part 36, a sensing part 37 and a sharing condition calculating part 38.

The sensing period information receiving part 31 receives sensing period information from the base station 10 of the interfered system 1 via the wire or wireless network. The sensing period information setting part 32 sets the sensing period in a period indicated by the sensing period information received by the sensing period information receiving part 31.

The RF part 36 performs reception processing of a wireless signal via an antenna and performs conversion of the reception data into a predetermined frequency and A/D conversion. The PHY processing part 34 performs reception processing in the physical layer and performs bit deinterleaving, demodulation demapping, error-correcting decoding of the reception data input from the PF part 36. The MAC processing part 33 performs reception processing in the MAC layer and controls the reception timing of the reception data containing the transmission prohibition period information input from the PHY processing part 34.

The sensing part 37 receives a busy tone signal transmitted from the mobile terminal 20, in the sensing period set by the sensing period information setting part 32, and measures the reception strength of the received busy tone signal. The sharing condition calculating part 38 uses the reception strength of the busy tone signal measured by the sensing part 37 as a basis to calculate the sharing conditions of the transmission data transmitted using the sharing frequency band.

The sharing condition calculating part 38 has a threshold for judging the reception strength, and when the reception strength of the busy tone signal is equal to or more than the threshold, it estimates that there is an interfered station around the access point 30 and makes the transmission power controlling part 35 to reduce the transmission power of the transmission data using the shared frequency band. On the other hand, when the reception strength of the busy tone signal is less than the threshold, the sharing condition calculating part 38 estimates that there is no interfered station around the access point 30 and controls the transmission power controlling part 35 to increase the transmission power of the transmission data using the shared frequency band.

In this way, the mobile terminal 20 is configured to generate the busy tone signal by the busy tone signal generating part 27 and transmit the busy tone signal to the access point 30 during the sensing period. Besides, the access point 30 is configured to sense the busy tone signal by the sensing part 37 and to set the transmission power determined by the sharing condition calculating part 38.

Figure 6:
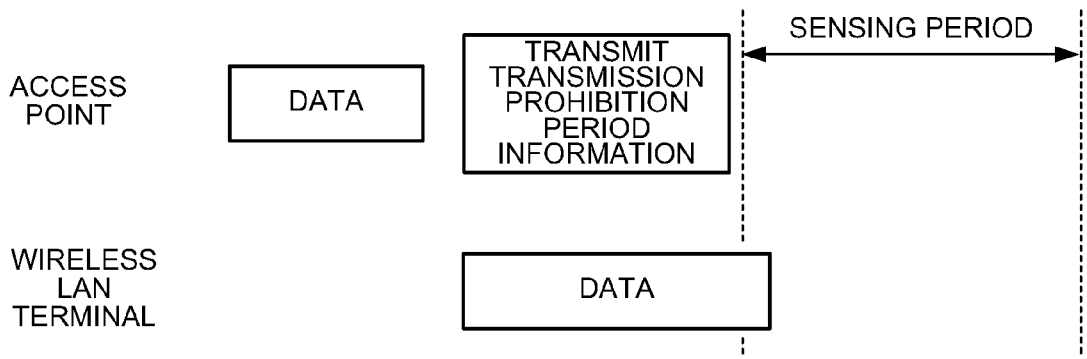
FIG. 6A is an explanatory view of notifying processing of a transmission prohibition period by the access point according to the first exemplary embodiment of the present invention.
FIG. 6B is another explanatory view of the notifying processing of the transmission prohibition period by the access point according to the first exemplary embodiment of the present invention.
FIG. 6C is yet another explanatory view of the notifying processing of the transmission prohibition period by the access point according to the first exemplary embodiment of the present invention.
Figure 6:
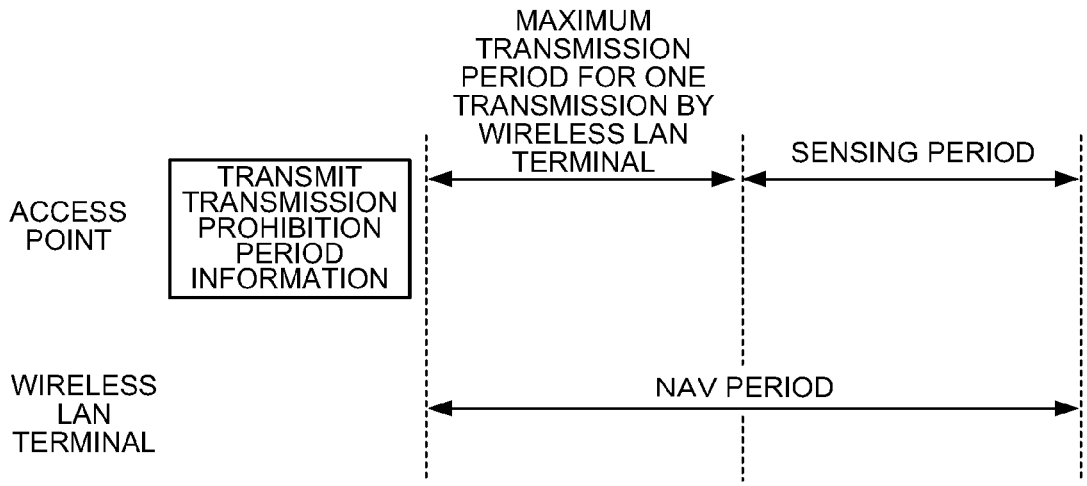
Figure 6:
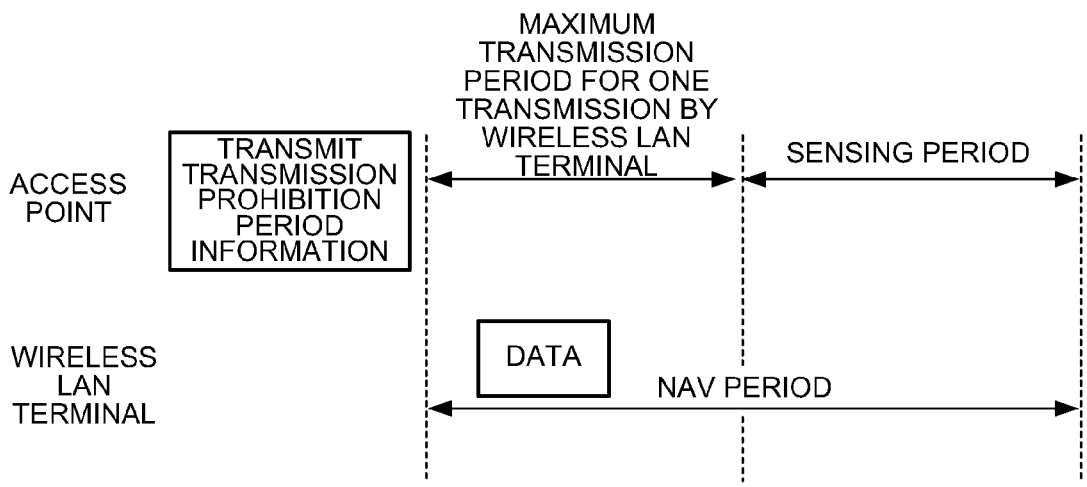

With reference to FIGS. 6A to 6C, description is made about the notifying processing of the transmission prohibition period information by the access point that is a feature of the present invention. FIGS. 6A to 6C are explanatory views of the notifying processing of the transmission prohibition period by the access point. Here, FIG. 6A illustrates one example (comparative example) where the transmission timing of the transmission prohibition period information is set just before the start point of the sensing period. FIG. 6B illustrates an example where the transmission time of the transmission prohibition period information is set to be a maximum transmission period for one transmission by the wireless LAN terminal prior to the sensing period.

In the comparative example illustrated in FIG. 6A, the transmission timing of the transmission prohibition period information is set just before the start point of the sensing period. In this case, if the wireless LAN terminal is performing the transmission processing when the access points starts to transmit the transmission prohibition period information, the access point is not able to notify the wireless LAN terminal of the transmission prohibition period information. Therefore, as the transmission prohibition period information is not sent to the wireless LAN terminal before starting of the sensing period, the wireless LAN terminal performs transmission processing during the sensing period. As a result, there occurs intra-system interference during the sensing period and it becomes difficult for the access point to sense a busy tone signal from the mobile terminal which is the interfered station accurately.

On the other hand, in this embodiment illustrated in FIG. 6B, the transmission timing of the transmission prohibition period information is set to be a maximum transmission period for one transmission by the wireless LAN terminal 50 prior to the start point of the sensing period. In this case, the transmission prohibition period information is transmitted from the access point 30 to the wireless LAN terminal 50, avoiding the time of the transmission processing by the wireless LAN terminal 50 just before the start point of the sensing period. With this structure, just before the start of the sensing period, the notifying processing of the transmission prohibition period information from the access point 30 is prevented from being inhibited by the transmission processing of the wireless LAN terminal 50.

Accordingly, as the NAV period is set in the wireless LAN terminal 50 before the sensing period to suppress the intra-system interference, the access point 30 is able to precisely sense a busy tone signal from the mobile terminal 20 as the interfered station during the sensing period. Here, the transmission processing of the wireless LAN terminal 50 is permitted as far as it is finished just before the start point of the sensing period even in the NAV period as illustrated in FIG. 6C.

Figure 7A:
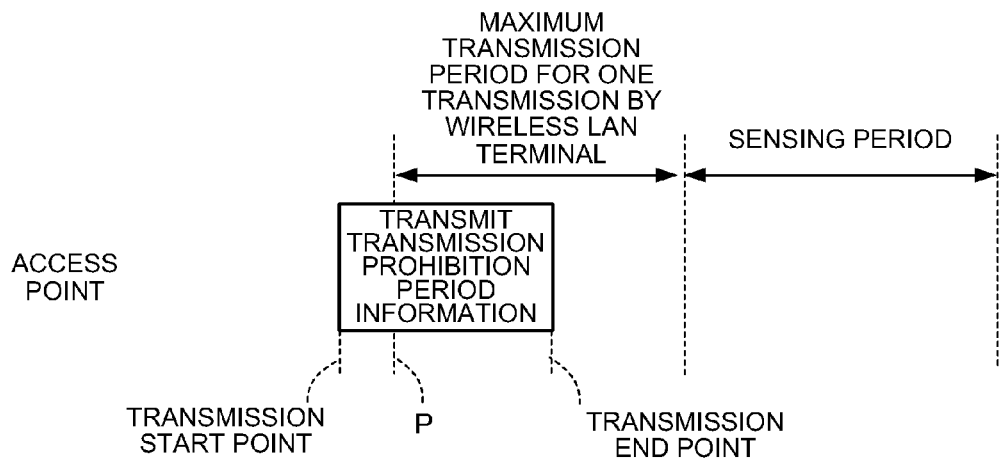
FIG. 7A is an explanatory view of a maximum transmission period for one transmission by the wireless LAN terminal prior to a start point of a sensing period according to the first exemplary embodiment of the present invention.
Figure 7:
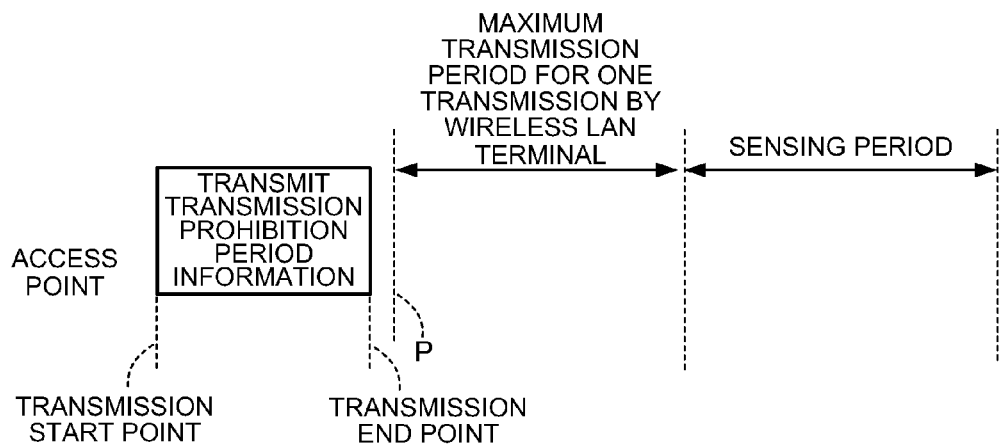
FIG. 7B is another explanatory view of a maximum transmission period for one transmission by the wireless LAN terminal prior to a start point of a sensing period according to the first exemplary embodiment of the present invention.

The time of a "maximum transmission period for one transmission by the wireless LAN terminal 50 prior to the start point of the sensing period" mentioned herein may be such that, as illustrated in FIG. 7, the start point of transmission of the transmission prohibition period information is any time before the point P set a maximum transmission period for one transmission by the wireless LAN terminal 50 prior to the start point of the sensing period. For example, as illustrated in FIG. 7A, the start point of transmission of the transmission prohibition period information may be prior to the point P and the end point of transmission of the transmission prohibition period information may be after the point P. Or, as illustrated in FIG. 7B, the start point and end point of transmission of the transmission prohibition period information may be prior to the point P.

Further, the access point 30 sets backoff in accordance with a monitoring result by the traffic monitoring part 39. The access point 30 sets not to use backoff first when the traffic volume is equal to or more than a threshold. With this structure, when the traffic volume is high and there is high possibility of failing in contention, the access point 30 is able to make the transmission prohibition period information a higher priority than the transmission data from the wireless LAN terminal 50.

In addition, when the traffic volume is less than the threshold, the access point 30 uses backoff first and stops using backoff when it fails in contention. With this structure, the access point 30 is able to use backoff when the traffic volume is small and there is low possibility of failing in contention. Further, when it fails in contention though there is low possibility of failing in contention, the access point 30 is able to make the transmission prohibition period information a higher priority than the transmission data from the wireless LAN terminal 50. When it is set not to use backoff when failing in contention, the access point 30 sets it independently from the traffic volume.

In this embodiment, the backoff is set in accordance with a monitoring result by the traffic monitoring part 39. However, this structure is not intended for limiting the present invention. The access point 30 may decide to use or not to use backoff in advance without the traffic monitoring part 39 provided. With this structure, the access point 30 can be of simpler structure.

Figure 8:
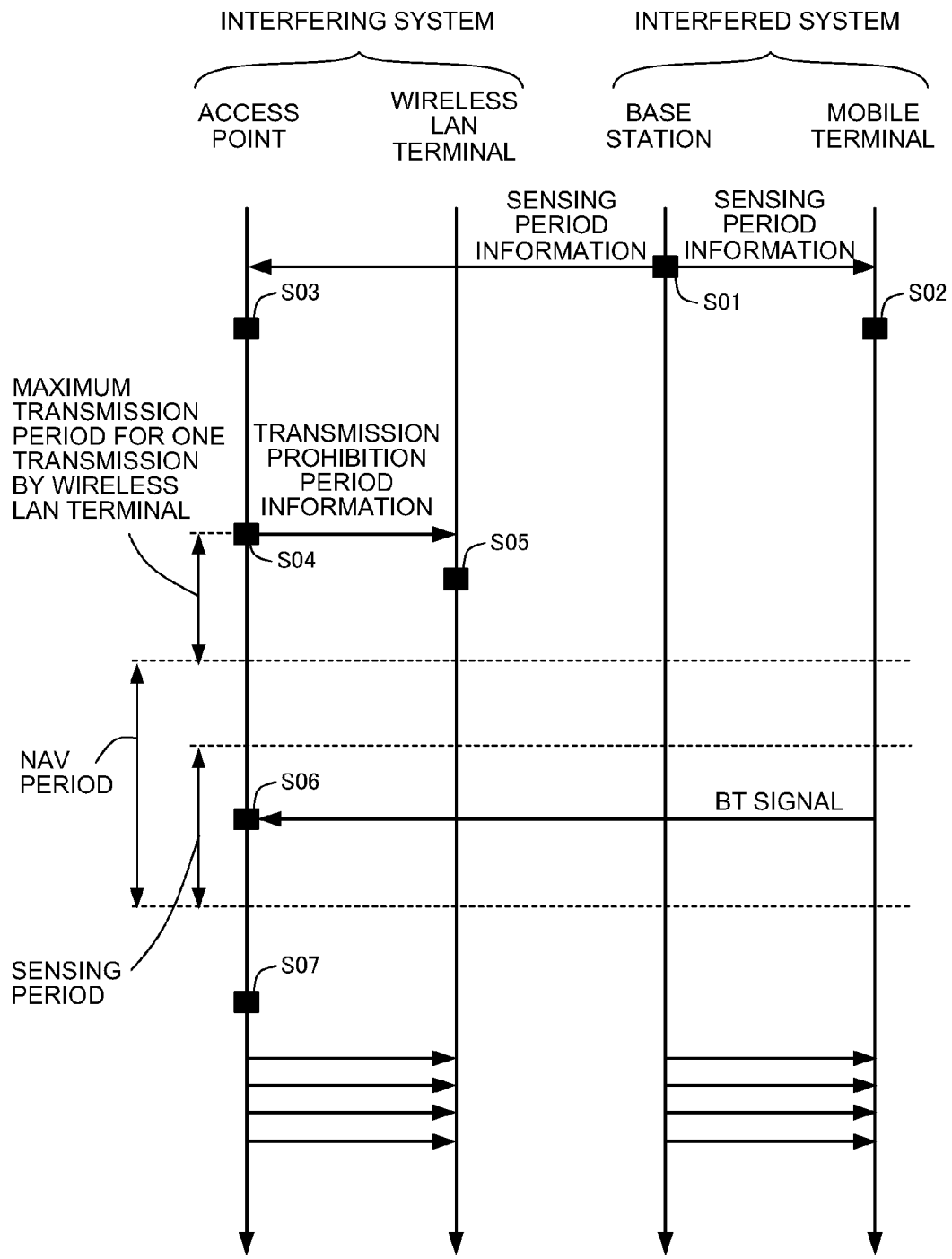
FIG. 8 is an explanatory view of an operation sequence of sensing processing when the access point is the interfering station and the mobile terminal is the interfered station according to the first exemplary embodiment of the present invention.

With reference to FIG. 8, description is made about an operation sequence of sensing processing when the access point as illustrated in FIG. 1 is the interfering station and the mobile terminal is the interfered station. FIG. 8 is an explanatory view of the operation sequence of the sensing processing when the access point as illustrated in FIG. 1 is the interfering station and the mobile terminal is the interfered station.

As illustrated in FIG. 8, the base station 10 the transmits sensing period information to the access point 30 as the interfering station and the mobile terminal 20 as the interfered station (step S01). The mobile terminal 20 sets a busy tone signal transmission period in the period indicated by the sensing period information received by the base station 10 (step S02). The access point 30 sets the sensing period in a period indicated by the sensing period information received from the base station 10 (step S03).

The access point 30 transmits the wireless LAN terminal 50 the transmission prohibition period information a maximum transmission period of one transmission of the wireless LAN terminal 50 prior to the start point of the set sensing period (step S04). The wireless LAN terminal 50 sets the NAV period mentioned in the transmission prohibition period information received from the access point 30 (step S05). Then, the wireless LAN terminal 50 is prohibited to perform transmission processing from the time before the start point of the sensing period until expiration of the sensing period.

The access point 30 receives a busy tone signal from the mobile terminal 20 in the set sensing period and measures the signal strength of the received busy tone signal (step S06). The access point 30 uses the signal strength of the measured busy tone signal to set the transmission power of the downlink signal transmitted using the shared frequency band in such a manner that the interference is suppressed to be the interference permissible level or less (step S07). Then, the access point 30 performs transmission of the downlink signal with the set transmission power.

Figure 9:
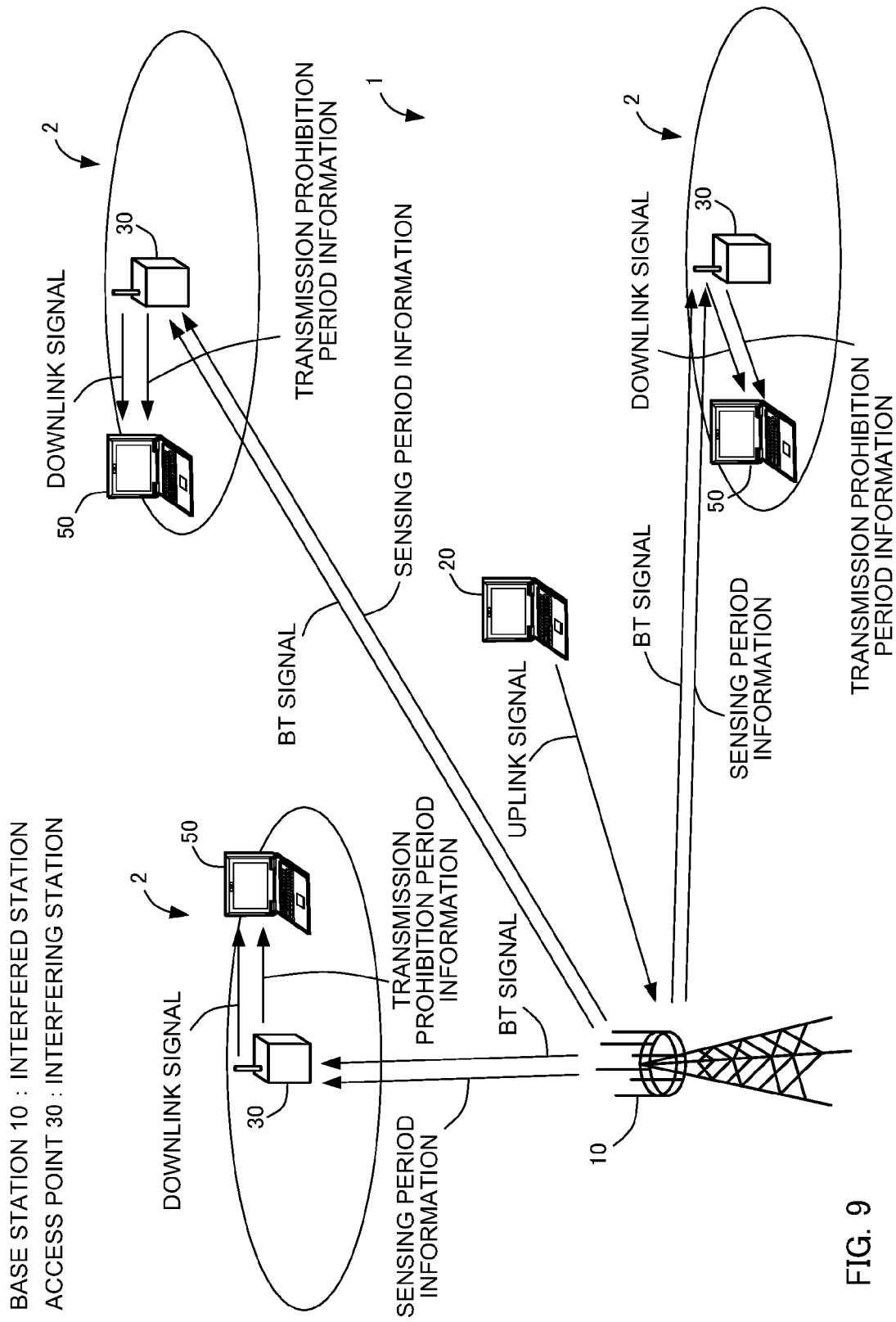
FIG. 9 is a schematic view of a complex system when the uplink of the interfered system is an interfered side and the downlink of the interfering system is an interfering side according to the first exemplary embodiment of the present invention.

With reference to FIG. 9, description is made about the system overview in which the uplink of the interfered system is the interfered side and the downlink of the interfering system is the interfered side. In the system configuration illustrated in FIG. 9, the transmission prohibiting processing at the wireless LAN terminal and the notifying processing of the transmission prohibition period information at the access point are the same as those in the system configuration illustrated in FIG. 1 described above, and therefore, their description is omitted here. Besides, the functional structure of the notifying processing of the busy tone signal at the base station is almost the same as the functional structure of the notifying processing of the busy tone signal at the mobile terminal illustrated in FIG. 5, and therefore, its description is omitted here. FIG. 9 is a schematic view of a complex system when the uplink of the interfered system is the interfered side and the downlink of the interfering system is the interfering side.

In FIG. 9, the access point 30 that functions as a transmitting device in the interfering system 2 is the interfering station and the base station 10 that functions as a receiving device in the interfered system 1 is the interfered station. Therefore, the base station 10 transmits a busy tone signal and the access point 30 senses the busy tone signal to control the transmission power of the downlink.

More specifically, the access point 30 transmits, to the wireless LAN terminal 50, the transmission prohibition period information a maximum transmission period for one transmission by the wireless LAN terminal 50 prior to the start point of the sensing period. The wireless LAN terminal 50 sets the NAV period mentioned in the transmission prohibition period information received by the access point 30 and prohibits the transmission processing until expiration of the sensing period. The access point 30 receives a busy tone signal from the base station 10 during the sensing period while the transmission processing of the wireless LAN terminal 50 is prohibited, and uses the signal strength of the busy tone signal as a basis to set the transmission power of the downlink signal transmitted using the shared frequency band to be the interference permissible level or less. Then, the access point 30 performs transmission of the downlink signal with the set transmission power.

Figure 10:
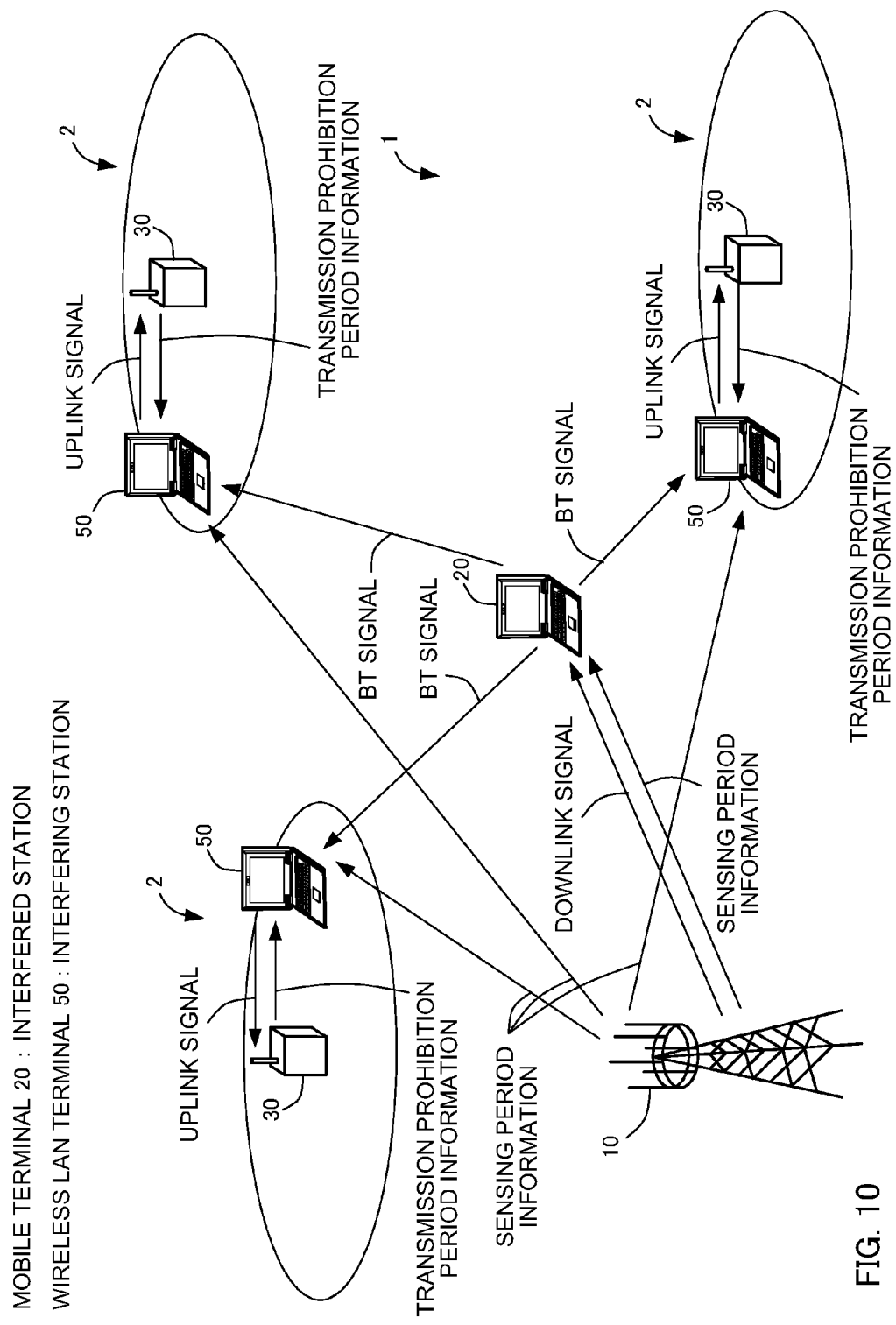
FIG. 10 is a schematic view of a complex system when the downlink of the interfered system is an interfered side and the uplink of the interfering system is an interfering side according to the first exemplary embodiment of the present invention.

With reference to FIG. 10, the overview of the system is described in which the downlink of the interfered system is the interfered side and the uplink of the interfering system is the interfering side. In the system configuration illustrated in FIG. 10, the notifying processing of the transmission prohibition period information at the access point and the transmission prohibiting processing at the wireless LAN terminal are the same as those in the system configuration illustrated in FIG. 1 and therefore, their description is omitted here. FIG. 10 is a schematic view of a complex system when the downlink of the interfered system is the interfered side and the uplink of the interfering system is the interfering side.

In FIG. 10, the wireless LAN terminal 50 that functions as a transmitting device in the interfering system 2 is the interfering station and the mobile terminal 20 that functions as a receiving device in the interfered system 1 is the interfered station. Accordingly, the mobile terminal 20 transmits a busy tone signal and the wireless LAN terminal 50 senses the busy tone signal to control transmission power of the uplink signal.

With reference to FIGS. 4 and 5, description is made about the functional structure of sensing control performed between the wireless LAN terminal and the mobile terminal. FIG. 5 is a functional block diagram of notifying processing of a busy tone signal at the mobile terminal when the wireless LAN terminal is the interfering station and the mobile terminal is the interfered station.

As illustrated in FIG. 5, the mobile terminal 20 has a sensing period information receiving part 21, a busy tone signal transmission period setting part 22, a MAC processing part 23, a PHY processing part 24, and an RF part 26. Further, the MAC processing part 23 has a busy tone signal generating part 27.

The sensing period information receiving part 21 receives the sensing period information transmitted from the base station 10. The busy tone signal transmission period setting part 22 sets the transmission period of the busy tone signal in a period indicated by the sensing period information received by the sensing period information receiving part 21. The MAC processing part 23 performs transmission processing in the MAC layer and controls transmission timing of the transmission data and the like.

The busy tone signal generating part 27 of the MAC processing part 23 generates a busy tone signal transmitted during a transmission period of the busy tone signal set by the busy tone signal transmission period setting part 22. The PHY processing part 24 converts the transmission data into a signal format conforming to the frame format and performs processing of bit interleaving, modulation mapping and error-correcting coding of transmission data containing the busy tone signal input from the MAC processing part 23. The RF part 26 performs transmission processing of a wireless signal via an antenna and performs D/A conversion of the transmission data and conversion into a carrier frequency.

FIG. 4 is a functional block diagram of the sensing processing at the wireless LAN terminal when the mobile terminal is the interfered station and the wireless LAN terminal is the interfering station as illustrated in FIG. 10. Here, FIG. 4 contains functional blocks other than the sensing processing, however, their description is omitted here.

As illustrated in FIG. 4, the wireless LAN terminal 50 has a sensing period information setting part 52, a MAC processing part 53, a PHY processing part 54, a transmission power controlling part 55, an RF part 56, a sensing part 57 and a sharing condition calculating part 58.

The RF part 56 performs reception processing of a wireless signal via an antenna and performs conversion into a predetermined frequency of reception data and A/D conversion. The PHY processing part 54 performs reception processing in the physical layer and performs processing of bit deinterleaving, demodulation demapping, error-correcting decoding of reception data input from the RF part 56 and the like. The MAC processing part 53 performs reception processing in the MAC layer and controls the reception timing of reception data containing the transmission prohibition period information input from the PHY processing part 54, and the like.

The sensing period information setting part 52 sets sensing period in a period indicated by the sensing period information received via the RF part 56. The sensing part 57 receives a busy tone signal, which is transmitted from the mobile terminal 20, in the sensing period set by the sensing period information setting part 52 and measures the reception strength of the received busy tone signal. The sharing condition calculating part 58 uses the measured reception strength of the busy tone signal by the sensing part 57 as a basis to calculate sharing conditions of transmission data transmitted using the shared frequency band.

In the system configuration illustrated in FIG. 10, the access point 30 transmits, to the wireless LAN terminal 50, the transmission prohibition period information a maximum transmission period for one transmission by the wireless LAN terminal 50 prior to the start point of the sensing period. The wireless LAN terminal 50 sets a NAV period contained in the transmission prohibition period information received from the access point 30 and prohibits the transmission processing until expiration of the sensing period. The wireless LAN terminal 50 receives a busy tone signal from the mobile terminal 20 in the sensing period while the transmission processing is prohibited and uses the signal strength of the busy tone signal as a basis to set the transmission power of the uplink signal transmitted using the shared frequency band to fall within the interference permissible level. Then, the wireless LAN terminal 50 performs transmission of the uplink signal with the set transmission power.

Figure 11:
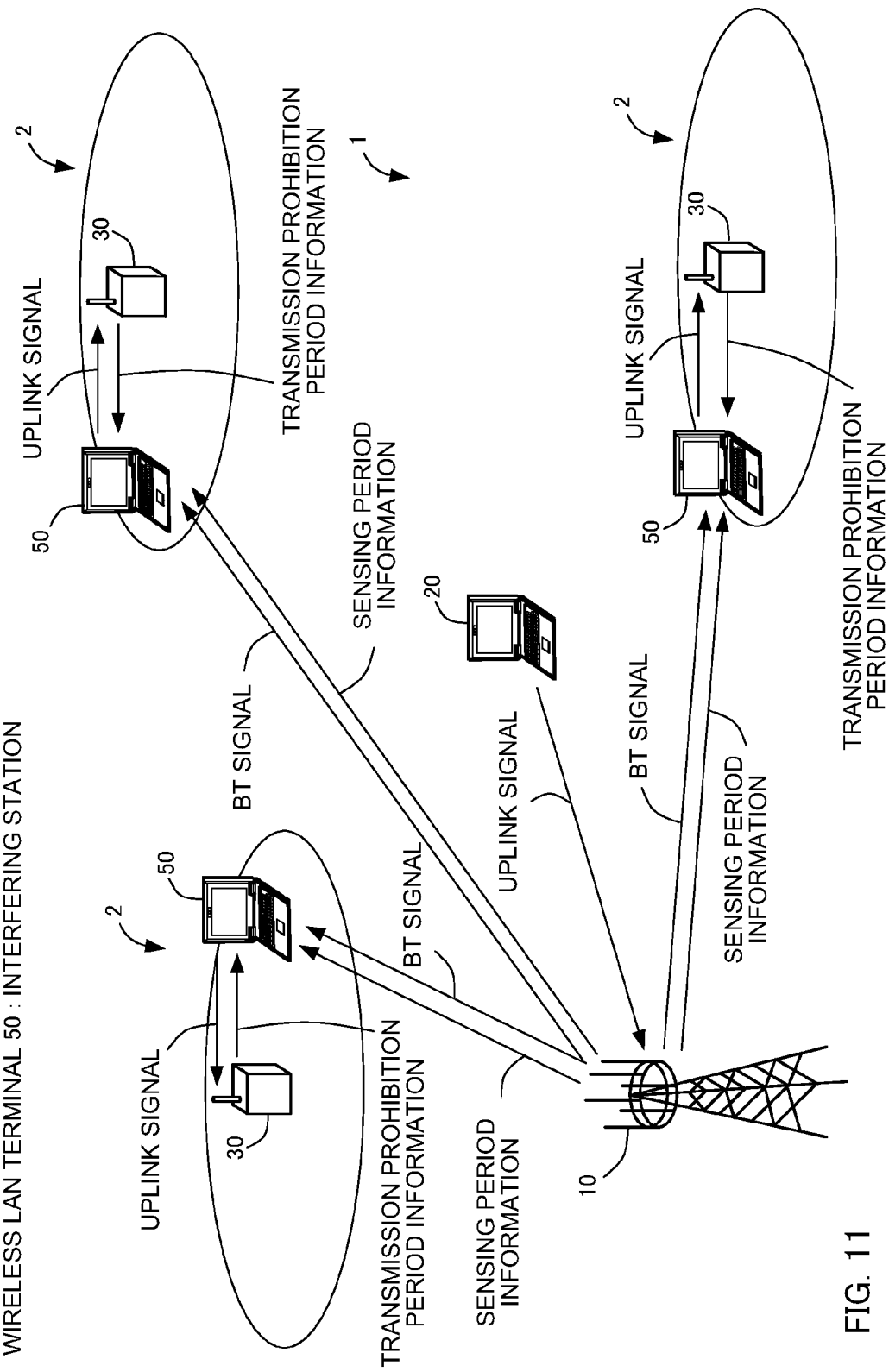
FIG. 11 is a schematic view of a complex system when the uplink of the interfered system is an interfered side and the uplink of the interfering system is an interfering side according to the first exemplary embodiment of the present invention.

With reference to FIG. 11, description is made about the overview of a system in which the uplink of the interfered system is the interfered side and the uplink of the interfering system is the interfering side. In the system configuration shown in FIG. 11, the notifying processing of the transmission prohibition period information at the access point and the transmission prohibiting processing at the wireless LAN terminal are the same as those in the above-described system configuration illustrated in FIG. 1 and their description is omitted here. Besides, the functional structure of the notifying processing of the busy tone signal at the base station is also the same as the functional structure of the notifying processing of the busy tone signal at the mobile terminal shown in FIG. 1 and its description is omitted here. FIG. 11 is a schematic view of a complex system when the uplink of the interfered system is the interfered side and the uplink of the interfering system is the interfering side.

In FIG. 11, the wireless LAN terminal 50 that functions as a transmitting device in the interfering system 2 is the interfering station and the base station 10 that functions as a receiving device in the interfered system 1 is the interfered station. Accordingly, the base station 10 transmits a busy tone signal and the wireless LAN terminal 50 senses the busy tone signal to control the transmission power of the uplink.

More specifically, the access point 30 transmits the wireless LAN terminal 50 the transmission prohibition period information a maximum transmission period of one transmission by the wireless LAN terminal 50 prior to the start point of the sensing period. The wireless LAN terminal 50 sets a NAV period mentioned in the transmission prohibition period information received from the access point 30 and prohibits transmission processing until expiration of the sensing period. The wireless LAN terminal 50 receives a busy tone signal from the base station 10 during the sensing period while the transmission processing is prohibited, and uses the signal strength of the busy tone signal as a basis to set the transmission power of the uplink signal transmitted using the shared frequency band to fall within the interference permissible level of the base station. Then, the wireless LAN terminal 50 performs transmission of the uplink signal with the set transmission power.

As described above, with the access point 30 according to the present embodiment, the access point 30 in the interfering system 2 notifies the wireless LAN terminal 50 of the transmission prohibition period information a maximum transmission period for one transmission by the wireless LAN terminal 50 prior to the start point of the sensing period. Therefore, prevention of notification of the transmission prohibition period information by transmission processing of the wireless LAN terminal 50 just before the sensing period is suppressed. Hence, the transmission processing inside the interfering system 2 in the sensing period is prohibited to suppress intra-system interference and it becomes possible to sense a busy tone signal from the interfered station appropriately. Besides, the access point 30 calculates sharing conditions in consideration of the interference level given to the interfered station by sensing the busy tone signal from the interfered station. Therefore, it is possible to prevent interference to the interfered station without reducing transmission chances from the access point 30 and to improve the use efficiency of the shared frequency band.

Figure 12:
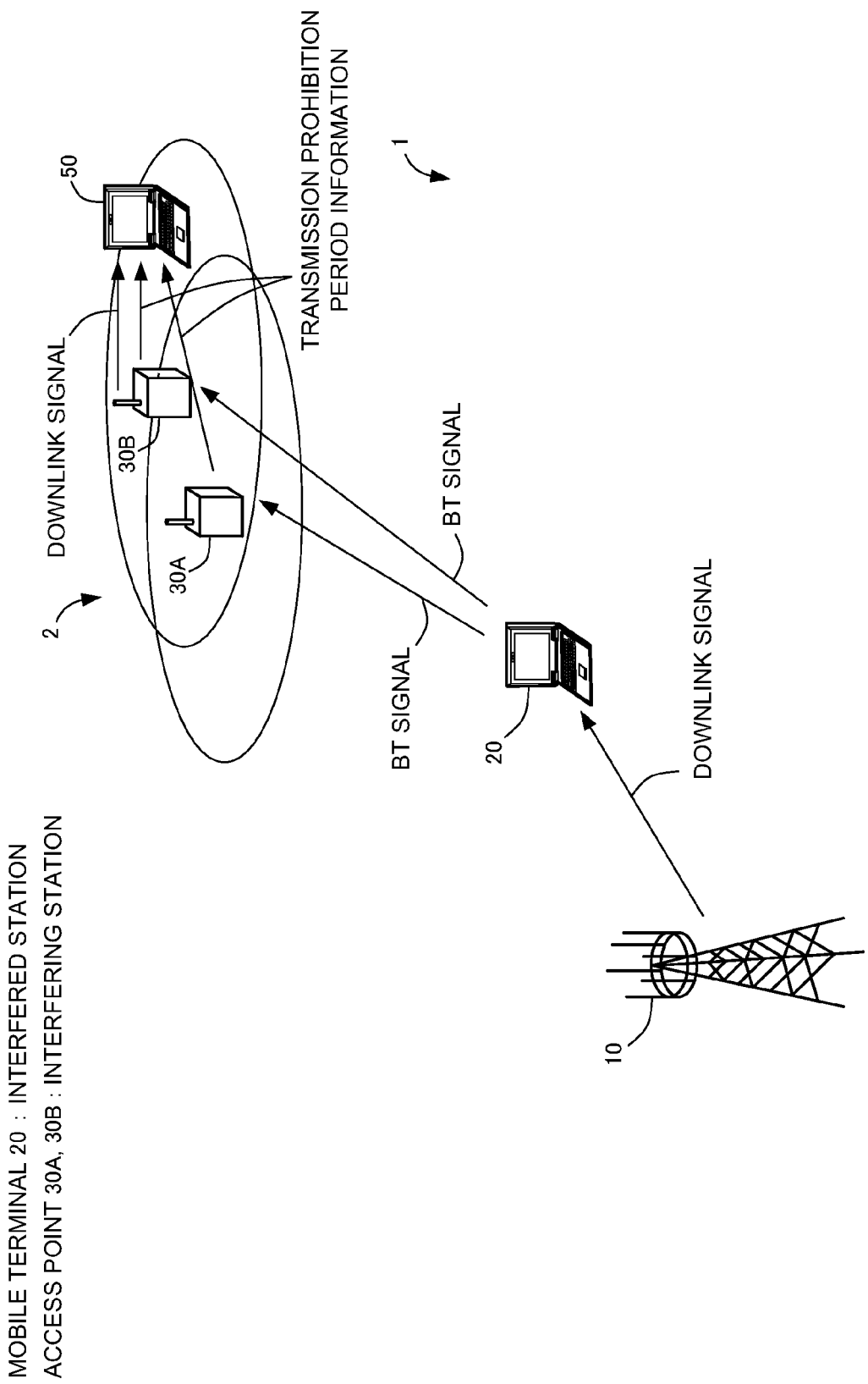
FIG. 12 is a schematic view of a complex system when the downlink of the interfered system is an interfered side and the downlink of the interfering system is an interfering side according to a second exemplary embodiment of the present invention.

Next description is made about a second embodiment of the present invention. A complex system according to the second embodiment of the present invention is different from that of the above-described first embodiment in that an interfering system of this embodiment has two access points. This difference is particularly described below. FIG. 12 is a schematic view of the complex system in which the downlink of the interfered system is an interfered side and the downlink of the interfering system is an interfering side. Here, description is made by way of the example where the downlink of the interfered system is the interfered side and the downlink of the interfering system is the interfering side, however, this system configuration is not intended for limiting the present invention, but this embodiment is also applicable to the system configurations of FIGS. 9, 10 and 11.

As illustrated in FIG. 12, the interfering system 2 has two access points 30A and 30B that are arranged relatively close to each other. These two access points 30A and 30B have different communicable ranges and the wireless LAN terminal 50 exists only in the communicable range of the access point 30B. In this case, if only the one access point 30A is configured to transmit the transmission prohibition period information, the transmission prohibition period information is not transmitted to the wireless LAN terminal 50 that exists in the communicable range of the other access point 30B.

Figure 13:
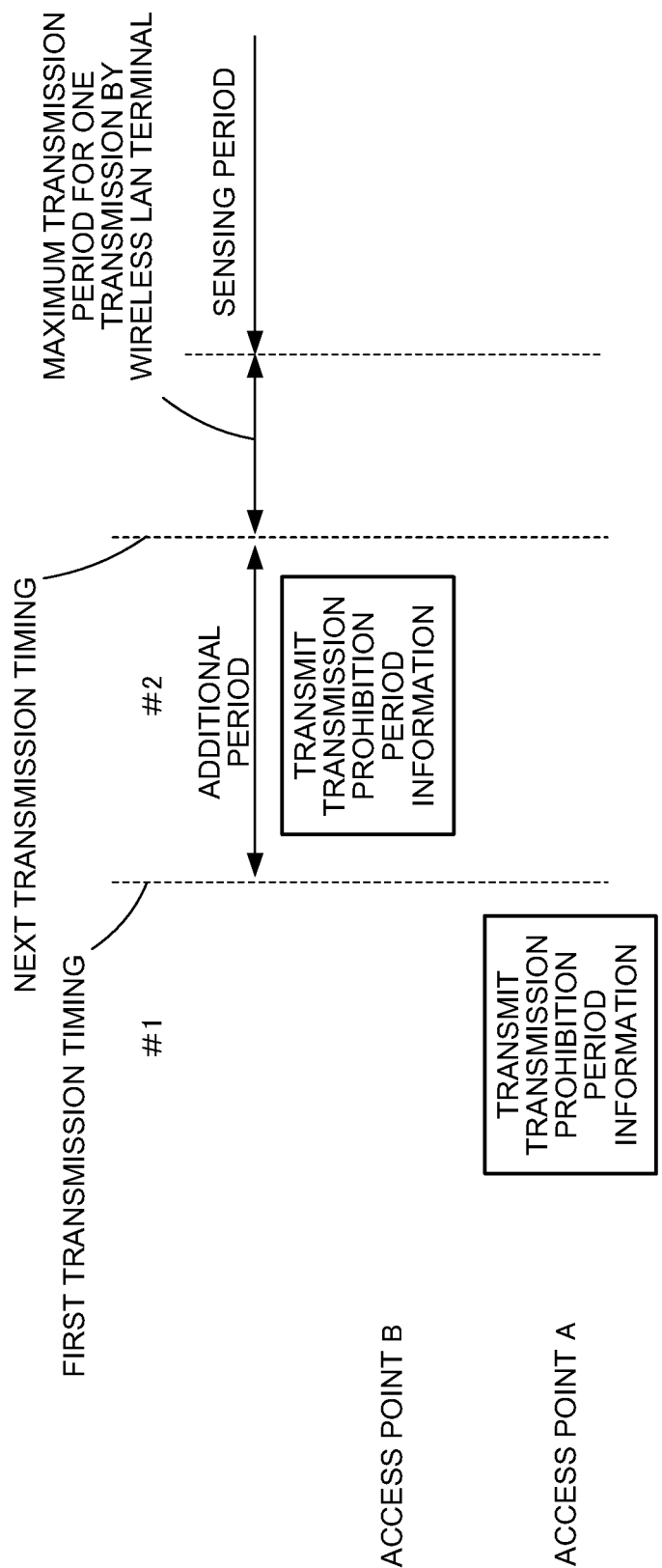
FIG. 13 is an explanatory view of notifying processing of transmission prohibition periods by two access points according to the second exemplary embodiment of the present invention.

Then, if the two access points 30A and 30B are arranged relatively close to each other in the system, each of the two access points 30A and 30B is configured to transmit the transmission prohibition period information. Here, with reference to FIG. 13, description is made about the notifying processing of the transmission prohibition period information by the two access points. FIG. 13 is an explanatory view of the notifying processing of the transmission prohibition periods by the two access points.

As illustrated in FIG. 13, the transmission timing of the transmission prohibition period information is set to be a sum period prior to the start point of the sensing period, the sum period being obtained by adding an additional period that considers contention between the access points 30A and 30B to the maximum transmission period for one transmission by the wireless LAN terminal 50. Then, at the set point of transmission, the contention is performed between the access points 30A and 30B and transmission prohibition period information is transmitted from one access point 30A that has obtained a transmission right in contention.

Next, at the point of transmitting a maximum transmission period for one transmission by the wireless LAN terminal 50 prior to the start point of the sensing period, the transmission prohibition period information is transmitted from the other access point 30B to the wireless LAN terminal 50. In this transmission timing, though the NAV period is set in the other access point 30B by the transmission prohibition period information from the one access point 30A, transmission of the transmission prohibition period information is permitted temporarily. With this structure, it is possible to suppress prevention of the notifying processing of transmission prohibition period information from the access points 30A and 30B immediately before the start point of the sensing period by the transmission processing of the wireless LAN terminal 50.

Accordingly, the NAV period is set in the wireless LAN terminal 50 before the sensing period and the transmission processing of the wireless LAN terminal 50 is prohibited during the sensing period. Hence, the intra-system interference is suppressed and the access points 30A and 30B are able to precisely sense busy signals from the mobile terminal 20 which is interfered station.

As described above, the access points 30A and 30B of this embodiment, even when they are arranged close, they notify the wireless LAN terminal 50 of the transmission prohibition period information sufficiently before the start point of the sensing period. Accordingly, prevention of notification of the transmission prohibition period information by the transmission processing of the wireless LAN terminal 50 just before the sensing period is suppressed. Therefore, the transmission processing in the interfering system 2 in the sensing period is prohibited to suppress the intra-system interference and it becomes possible to sense the busy tone signal from the interfered station appropriately.

Figure 14:
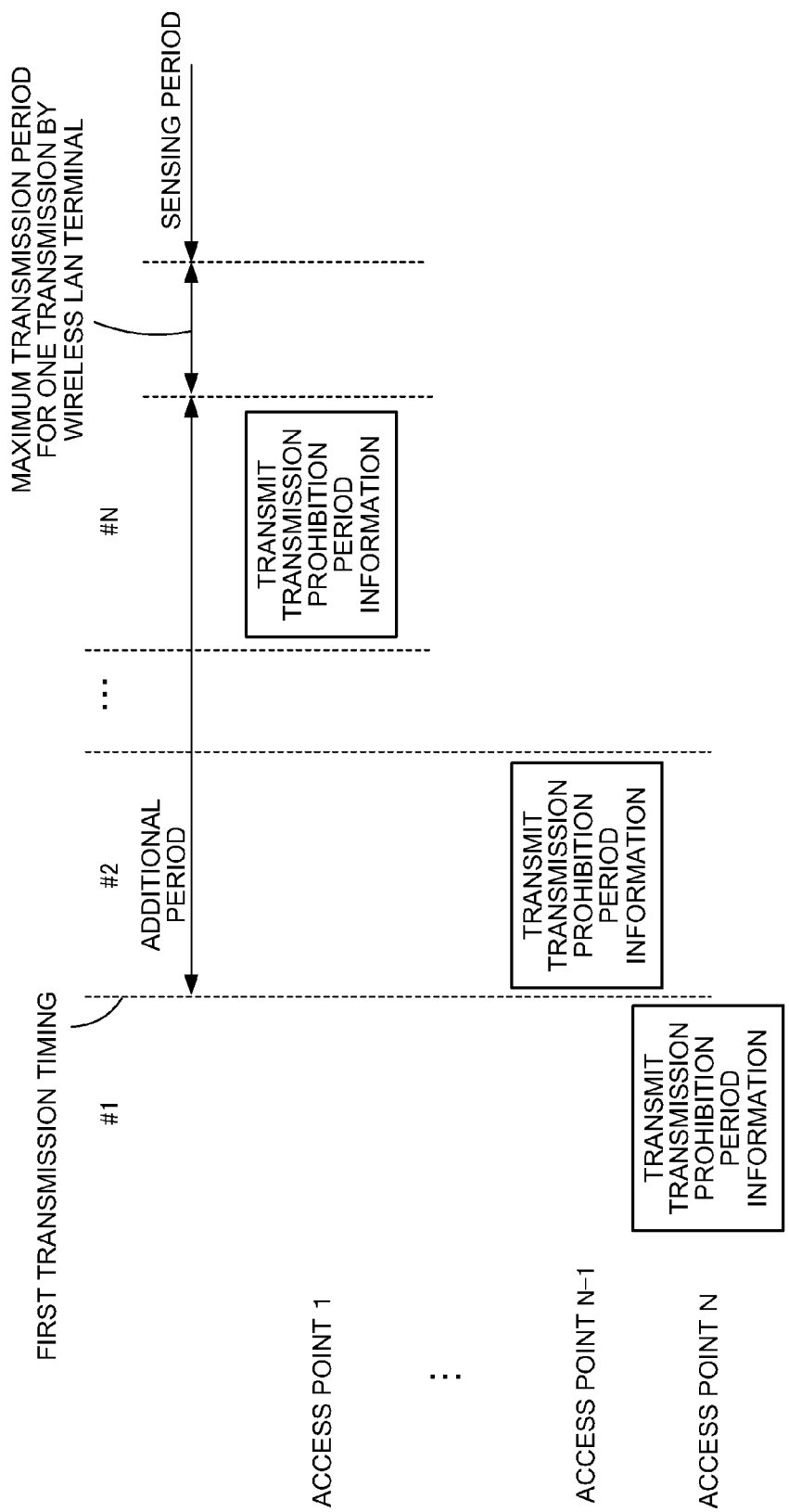
FIG. 14 is an explanatory view of notifying processing of transmission prohibition periods by three or more access points according to the second exemplary embodiment of the present invention.

Further, the above-mentioned second embodiment is configured such that two access points 30A and 30B are arranged closer. However, it may be configured such that there are three or more access points 30 arranged closer. As illustrated in FIG. 14, in this configuration, the transmission timing of the transmission prohibition period information is set to be a sum period prior to the start point of the sensing period, the sum period being obtained by adding an additional period that is set longer in accordance with the number of access points 30 to a maximum transmission period for one transmission by the wireless LAN terminal 50. With this configuration, it is possible to provide enough transmission period of the transmission prohibition period information by the plural access points 30 and to make the access points 30 send the transmission prohibition information one after another in the order of obtaining a transmission right.

Further, the above-mentioned second embodiment may be configured such that the transmission prohibition period information is transmitted a maximum transmission period for one transmission by the wireless LAN terminal 50×Z (actual number equal to or more than 1) prior to the start point of the sensing period. In this case, the number of Z may be determined by calculating the number of contentions of the wireless LAN terminal 50 and the plural access points 30.

Figure 15:
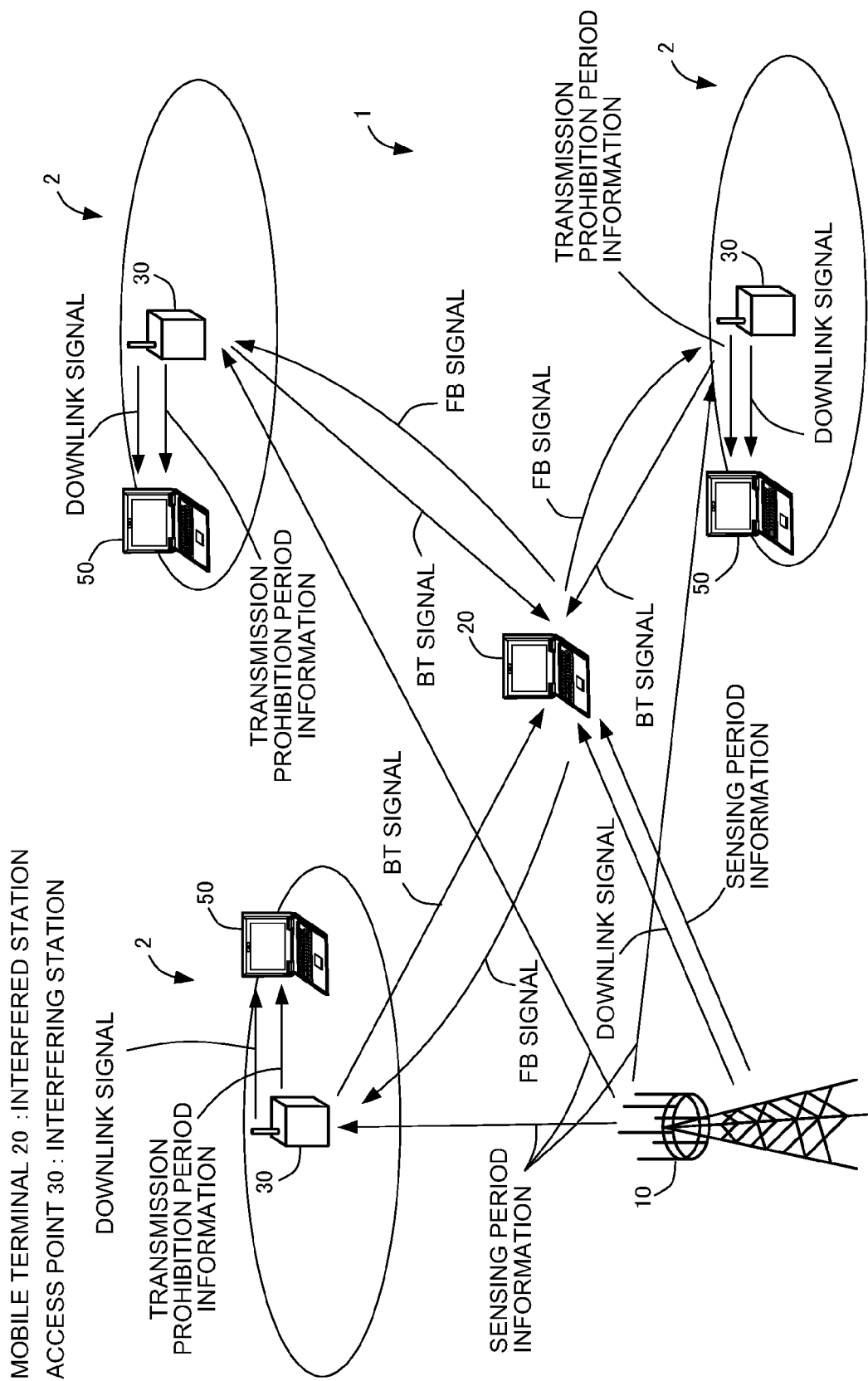
FIG. 15 is a schematic view of a complex system when the downlink of the interfered system is an interfered side and the downlink of the interfering system is an interfering side according to a third exemplary embodiment.

Next description is made about a third embodiment of the present invention. A complex system according to the third embodiment of the present invention is different from those of the above-described first and second embodiments in that sharing condition based on a sensing result of the interfered station is fed back to the interfering station. Accordingly, this different point is explained specifically. FIG. 15 is a schematic view of the complex system when the downlink of the interfered system is the interfered side and the downlink of the interfering system is the interfering side.

Here, the system configuration illustrated is such that the downlink of the interfered system 1 is the interfered side and the downlink of the interfering system 2 is the interfering side, however, this system configuration is not intended for limiting the present invention. The present invention may be applicable to the configuration in which the downlink of the interfered system 1 is the interfered side and the uplink of the interfering system 2 is the interfering side, the configuration in which the uplink of the interfered system 1 is the interfered side and the downlink of the interfering system 2 is the interfering side and the configuration in which the uplink of the interfered system 1 is the interfered side and the uplink of the interfering system 2 is the interfering side.

Further in the present invention, the interfering station of the interfering system 2 transmits a busy tone signal to the interfered station of the interfered system 1 and the interfered station senses the busy tone signal to control transmission power of the interfering station.

In FIG. 15, the access point 30 that acts as a transmitting device in the interfering system 2 is the interfering station and the mobile terminal 20 that acts as a receiving device in the interfered system 1 is the interfered station. Accordingly, the access point 30 transmits a busy tone signal and the mobile terminal 20 senses the busy tone signal to feed back the sharing condition of the access point 30.

More specifically, the access point 30 transmits the transmission prohibition period information to the wireless LAN terminal 50 a maximum transmission period for one transmission by the wireless LAN terminal 50 prior to the start point of the sensing period. The wireless LAN terminal 50 sets a NAV period mentioned in the transmission prohibition period information received from the access point 30 and prohibits the transmission processing until the end of sensing period. The mobile terminal 20 receives a busy tone signal from the access point 30 in the sensing period, uses the signal strength of the busy tone signal as a basis to determine the sharing conditions (transmission power, sharing condition applicable period, use frequency band, and the like), and transmits it to the access point 30. The access point 30 receives the sharing condition from the mobile terminal 20 and set the transmission power of the downlink signal, which is transmitted using the shared frequency band, to fall within an interference permissible level of the mobile terminal 20. Then, the access point 30 transmits a downlink signal with the set transmission power.

In this way, according to the access point 30 of the present embodiment, the access point 30 in the interfering system 2 notifies the wireless LAN terminal 50 of the transmission prohibition period information a maximum transmission period for one transmission by the wireless LAN terminal 50 prior to the start point of the sensing period. Therefore, prevention of notification of the transmission prohibition period information by the transmission processing of the wireless LAN terminal 50 just before the sensing period is suppressed. With this structure, the transmission processing inside the interfering system 2 in the sensing period is prohibited thereby to suppress intra-system interference and it becomes possible to transmit a busy tone signal from the interfering station to the interfered station appropriately. Further, the interfered station calculates sharing conditions in consideration of the interference to the interfered station by sensing the busy tone signal from the interfering station and feeds this back to the interfering station to control the sharing condition of the interfering station. Therefore, it is possible to prevent interference to the interfered station without reducing transmission opportunities from the access point 30 and to improve the use efficiency of the shared frequency band.

Each of the above-described embodiments is configured such that the transmission prohibition period information is transmitted from the access point 30 to the wireless LAN terminal 50. However, this configuration is not intended for limiting the invention. The wireless LAN terminal 50 may be configured to prohibit the transmission function in accordance with the sensing period information transmitted from the interfered system 1. In this case, the access point 30 and the wireless LAN terminal 50 need to receive the sensing period information from the interfered system 1.

Figure 16:
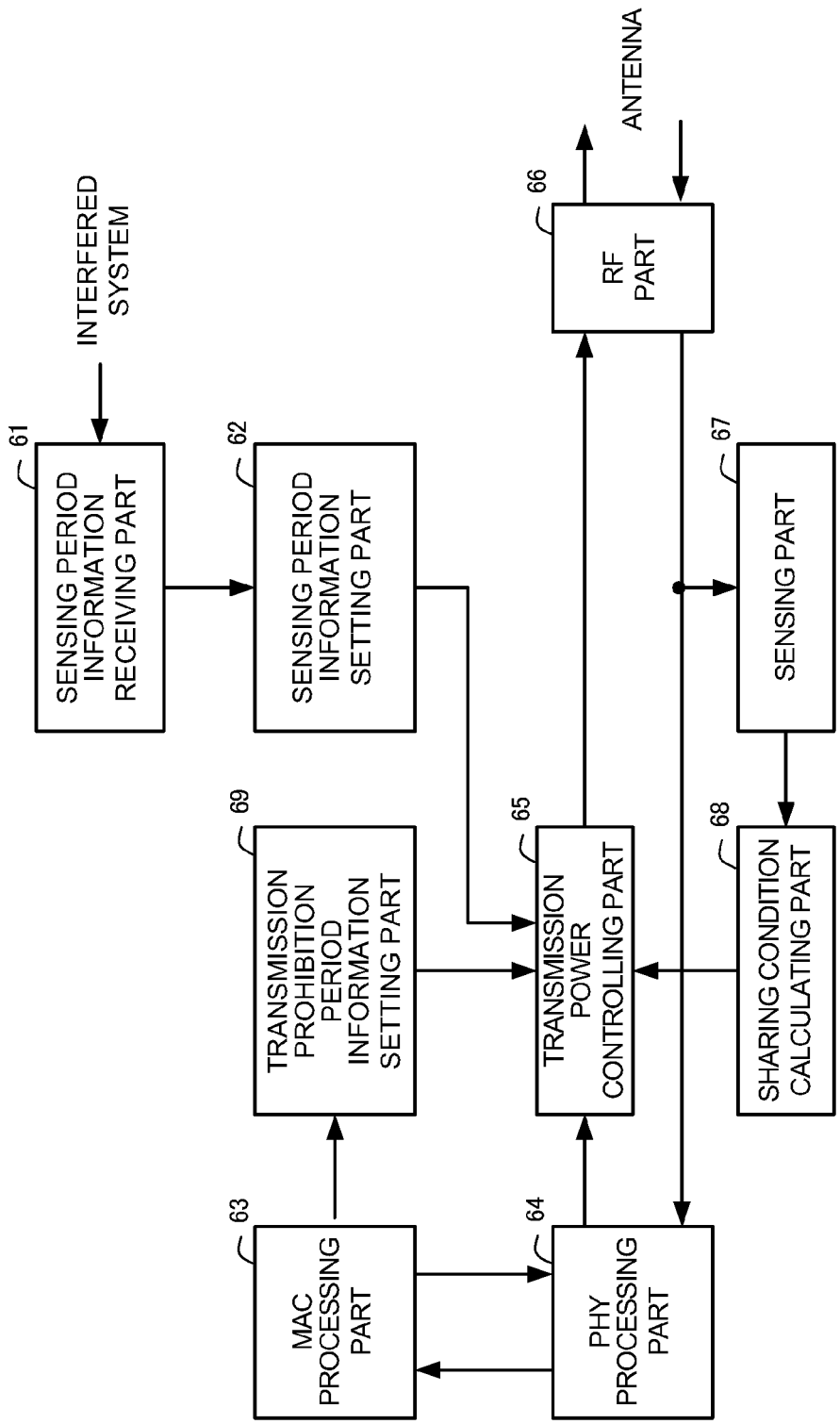
FIG. 16 is a functional block diagram of sensing processing of the interfering station, illustrating a modified example of the present invention.

Accordingly, all terminals in the interfering system have, for example, the functional structure as illustrated in FIG. 16. The sensing period information receiving part 61 receives the sensing period information from the interfered system 1. A sensing period information setting part 62 sets the sensing period to be a period shown by the sensing period information received by the sensing period information receiving part 61. The sensing period information setting part 62 stops the function of the transmission power controlling part 65 until the end of the sensing period to prohibit the transmission processing.

In this way, as all of the terminals of the interfering system 2 receive sensing signals directly from the interfered system 1, the transmission processing of transmission prohibition period information between the access point 30 and the wireless LAN terminal 50 can be omitted for a simple control structure.

Further, the above-described embodiments have been described by way of example where the access point serves as a transmitting/receiving device. However, this structure is not intended for limiting the present invention. In the interfering system, another terminal device having the function of an access point may be used as the transmitting/receiving device for communications.

Furthermore, the above-described embodiments have been described by way of example where the base station sends the sensing period information to the interfering station (access point or wireless LAN terminal). However, this structure is not intended for limiting the present invention. The sensing period information may be notified from the mobile terminal to the interfering station or from a device other than the base station or mobile terminal to the interfering station.

Yet furthermore, the above-described embodiments have been described by way of example where the sensing cycle may be fixed in advance thereby to be able to reduce power consumption. For example, if the sensing cycle is fixed in advance, once the sensing period is set in the interfering station, the timer for counting the elapsed time until the next sensing period is set. And, then, the interfering station stops the sensing operation during non sensing period.

And if the sensing cycle is variable, an interval to the next sensing period is notified from the interfering station to a terminal of the interfered system. Then, the interfering station receives the interval to the next sensing period from the interfering station and stops the sensing operation in the non sensing period.

And yet furthermore, the above-described embodiments have been given by way of example where the interfering system is a wireless LAN system. However, this structure is not intended for limiting the present invention. The communication system may be any system as far as the transmitting/receiving device for performing relay processing of the wireless communication terminal controls the transmission prohibiting processing of the wireless communication terminal.

And yet furthermore, the above-described embodiments have been given by way of example where the interfered station notifies the interfering station of the sensing period. However, this structure is not intended for limiting the present invention. For example, if the sensing period is fixed in the system, it may not be notified.

And yet furthermore, the above-described embodiments have been given by way of example where the transmission prohibition period information is a CTS frame. However, this structure is not intended for limiting the present invention. The transmission prohibition period information may be of any signal as far as it is a signal for prohibiting the transmission processing of the wireless LAN terminal.

And yet furthermore, the above-described embodiments have been given by way of example where the NAV period is mentioned in the transmission prohibition period information. However, this structure is not intended for limiting the present invention. The transmission prohibition period information may be any information as far as it mentions a period for prohibiting the transmission processing of the wireless LAN terminal.

And yet furthermore, the above-described embodiments have been given by way of example where the sensing part senses a busy tone signal. However, this structure is not intended for limiting the present invention. The sensing part may sense any signal as far as it can be used to measure the reception strength.

The above-described embodiments have been given only by way of example in every point and not intended for limiting the present invention. The scope of the present invention is defined by not only the above-described embodiments but also claims and should include equivalents to claims and modifications within the scope of claims.

What is claimed is:

1. A transmitting/receiving device comprising:
    a sensing period information receiving part for receiving, in an interfering system that shares at least a part of a frequency band with an interfered system, a sensing period information transmitted from the interfered system, the sensing period information showing a sensing period for a signal using the shared frequency band;
    a sensing period information setting part for setting a sensing period in a period indicated by the sensing period information, the sensing period having a start point and an end point;
    a media access control (MAC) processing part for setting a transmission timing of a transmission data in the interfering system and for notifying a terminal in the interfering system of the transmission data;
    a transmission prohibition period information generating part for generating the transmission data, the transmission data including a transmission prohibition period information for prohibiting transmission processing in the interfering system until the end point of the sensing period, the transmission prohibition period information having the transmission timing set to be a maximum transmission period for one transmission by the terminal in the interfering system prior to the start point of the sensing period;
    a physical layer (PHY) processing part for converting the transmission data into a wireless signal; and
    a transmission processing part for transmitting the wireless signal.

2. The transmitting/receiving device of claim 1, wherein in a transmission prohibition period shown in the transmission prohibition period information, if transmission processing by the terminal in the interfering system is finished before the start point of the sensing period, the transmission processing by the terminal in the interfering system is permitted.

3. The transmitting/receiving device of claim 1, wherein the MAC processing part sets the transmission timing of the transmission prohibition period information in a provided backoff period and, if it does not obtain a transmission right by contention in setting the transmission timing of the transmission prohibition period information, the MAC processing part sets the transmission timing of the transmission prohibition period information again without providing the backoff period.

4. The transmitting/receiving device of claim 1, wherein the MAC processing part sets the transmission timing of the transmission prohibition period information without providing a backoff period.

5. The transmitting/receiving device of claim 1, further comprising a traffic monitoring part for monitoring a traffic volume in the interfering system,
   wherein, when the traffic volume monitored by the traffic monitoring part is equal to or more than a predetermined threshold, the MAC processing part sets the transmission timing of the transmission prohibition period information without providing a backoff period, when the traffic volume monitored by the traffic monitoring part is less than the predetermined threshold, the MAC processing part sets the transmission timing of the transmission prohibition period information with the backoff period provided, and when it does not obtain a transmission right by contention in setting the transmission timing of the transmission prohibition period information with the backoff period provided, the MAC processing part sets the transmission timing of the transmission prohibition period information again without providing the backoff period.

6. The transmitting/receiving device of claim 1, wherein the interfering system is a wireless LAN system and the transmission prohibition period information is a Clear to Send (CTS) frame referring to a Network Allocation Vector (NAV) period.

7. The transmitting/receiving device of claim 1, wherein the sensing period information setting part sets the sensing period information by obtaining the sensing period information from a terminal in the interfered system.

8. The transmitting/receiving device of claim 1, wherein in a notifiable area of the transmission prohibition period information, there exists at least one other transmitting/receiving device that transmits a second transmission prohibition period information to the terminal in the interfering system; and
   the MAC processing part sets the transmission timing of the transmission prohibition period information having a sum period prior to the start point of the sensing period, the sum period being obtained by adding an additional period that is set longer in accordance with a number of the at least one other transmitting/receiving device to the maximum transmission period for one transmission by the terminal in the interfering system.

9. The transmitting/receiving device of claim 1, further comprising:
   a sensing part for sensing a busy tone signal from a device of the interfered system in the sensing period; and
   a sharing condition calculating part for using a sensing result by the sensing part as a basis to determine a sharing condition containing at least transmission power as a condition for transmission with use of the shared frequency band.

10. The transmitting/receiving device of claim 1, further comprising a busy tone signal transmitting part for transmitting a busy tone signal in a device of the interfered system for returning a sharing condition that is determined based on a sensing result of the busy tone signal during the sensing period and contains at least transmission power as a condition for transmission with use of the shared frequency band.

11. A wireless communication method comprising the steps of:
   in an interfering system that shares at least a part of a frequency band with an interfered system, receiving, from a terminal of the interfered system, sensing period information transmitted from the interfered system that shows a sensing period for a signal using a shared frequency band;
   setting a sensing period in a period indicated of the sensing period information, the sensing period having a start point and an end point;
   setting a transmission timing of a transmission data in the interfering system and notifying a terminal in the interfering system of the transmission data;
   generating the transmission data, the transmission data including a transmission prohibition period information for prohibiting transmission processing in the interfering system until the end point of the sensing period, the transmission prohibition period information having the transmission timing set to be a maximum transmission period for one transmission by the terminal in the interfering system prior to the start point of the sensing period;
   converting the transmission data into a wireless signal; and
   transmitting the wireless signal.

12. A transmitting/receiving device comprising:
   a sensing period information receiving part for receiving, in an interfering system that shares at least a part of a frequency band with an interfered system, a sensing period information transmitted from the interfered system, the sensing period information showing a sensing period for a signal using the shared frequency band;
   a sensing period information setting part for setting a sensing period in a period indicated by the sensing period information, the sensing period having a start point and an end point;
   a media access control (MAC) processing part for setting a transmission timing of a transmission data in the interfering system and for notifying a terminal in the interfering system of the transmission data;
   a transmission prohibition period information generating part for generating the transmission data, the transmission data including a transmission prohibition period information for prohibiting transmission processing in the interfering system until the end point of the sensing period, the transmission prohibition period information having the transmission timing set to be a maximum transmission period for one transmission by the terminal in the interfering system prior to the start point of the sensing period;
   a physical layer (PHY) processing part for converting the transmission data into a wireless signal;
   a transmission processing part for transmitting the wireless signal; and
   a traffic monitoring part for monitoring a traffic volume in the interfering system,
   wherein, when the traffic volume monitored by the traffic monitoring part is equal to or more than a predetermined threshold, the MAC processing part sets the transmission timing of the transmission prohibition period information without providing a backoff period, when the traffic volume monitored by the traffic monitoring part is less than the predetermined threshold, the MAC processing part sets the transmission timing of the transmission prohibition period information with the backoff period provided, and when it does not obtain a transmission right by contention in setting the transmission timing of the transmission prohibition period information with the backoff period provided, the MAC processing part sets the transmission timing of the transmission prohibition period information again without providing the backoff period.

* * * * *